(12) United States Patent
Harsh et al.

(10) Patent No.: US 12,185,700 B2
(45) Date of Patent: Jan. 7, 2025

(54) SMART HOPPER AND FEEDER ASSEMBLY

(71) Applicant: Smart Hopperz, Inc., Bartley, NE (US)

(72) Inventors: Gavin Harsh, Bartley, NE (US); Kolin Scheele, Bartley, NE (US)

(73) Assignee: Smart Hopperz, Inc., Bartley, NE (US)

( * ) Notice: Subject to any disclaimer, the term of this patent is extended or adjusted under 35 U.S.C. 154(b) by 232 days.

(21) Appl. No.: 17/581,140

(22) Filed: Jan. 21, 2022

(65) Prior Publication Data
US 2022/0232800 A1 Jul. 28, 2022

Related U.S. Application Data

(60) Provisional application No. 63/140,442, filed on Jan. 22, 2021.

(51) Int. Cl.
*A01K 5/02* (2006.01)
*B65G 33/08* (2006.01)

(52) U.S. Cl.
CPC .......... *A01K 5/0258* (2013.01); *B65G 33/08* (2013.01)

(58) Field of Classification Search
CPC .................................................. A01K 5/0258
See application file for complete search history.

(56) References Cited

U.S. PATENT DOCUMENTS

| | | | | |
|---|---|---|---|---|
| 5,315,958 A | * | 5/1994 | Forster | A01K 11/006 |
| | | | | 119/54 |
| 7,895,973 B1 | | 3/2011 | Whelan | |
| 2013/0199450 A1 | * | 8/2013 | Harty, Sr. | A01K 5/0275 |
| | | | | 119/51.02 |
| 2013/0298837 A1 | * | 11/2013 | Weelink | A01K 5/02 |
| | | | | 119/51.02 |
| 2017/0196203 A1 | * | 7/2017 | Huisma | G08C 17/02 |
| 2017/0223926 A1 | * | 8/2017 | Ausman | A01K 11/006 |
| 2017/0303503 A1 | * | 10/2017 | Mannebeck | A01K 5/0208 |
| 2017/0360001 A1 | | 12/2017 | Barney | |
| 2021/0127630 A1 | * | 5/2021 | Zimmerman | A61B 5/1118 |

OTHER PUBLICATIONS

C-Lock Inc., "Super SmartFeed Producer", Downloaded Aug. 14, 2020, https://web.archive.org/web/20201020121936/https://www.c-lockinc.com/producers/products/super-smartfeed.

* cited by examiner

*Primary Examiner* — Jessica B Wong
(74) *Attorney, Agent, or Firm* — Suiter Swantz IP

(57) ABSTRACT

A device, system, and method for autonomously feeding livestock animals includes receiving signals from RFID tag readers, determining animals associated with the signals are eligible for feeding, causing a motor to rotate an auger for dispensing an output feed amount, and updating a feed history of the animal. The animals are determined to be eligible for feeding based on a feed history associated with the RFID tag and a feed schedule or a feed routine.

17 Claims, 23 Drawing Sheets

SECTION VIEW A-A

ND FEEDER ASSEMBLY

SMART HOPPER AND FEEDER ASSEMBLY

CROSS-REFERENCE TO RELATED APPLICATION

The present application claims the benefit of U.S. Provisional Application Ser. No. 63/140,442, filed on Jan. 22, 2021, titled SMART HOPPER AND FEEDER ASSEMBLY, naming Gavin Harsh and Kolin Scheele as inventor, which is incorporated herein by reference in the entirety.

TECHNICAL FIELD

The present disclosure generally relates to animal husbandry, and more particularly to feeding devices for livestock.

BACKGROUND

Livestock, such as cattle, are typically fed at least one per day. To maximize animal health and growth it may be desirable to selectively control the amount of feed provided to an animal based on the animal's feeding habits and needs. Furthermore, the ability to monitor animal feeding habits may provide insight on which animals are not eating enough. Therefore, it would be advantageous to provide a device, system, and method that selectively control feed output to livestock.

SUMMARY

An autonomous feeding device is described, in accordance with one or more illustrative embodiments of the present disclosure. In one illustrative embodiment, the autonomous feeding device includes a bin defining an interior chamber for holding a feed. In another illustrative embodiment, the autonomous feeding device includes a tray configured to receive the feed from the bin. In another illustrative embodiment, the autonomous feeding device includes an auger disposed within a bottom portion of the interior chamber. In another illustrative embodiment, the autonomous feeding device includes a motor coupled to the auger. In another illustrative embodiment, the motor is configured to rotate the auger for dispensing the feed from the bin to the tray. In another illustrative embodiment, the autonomous feeding device includes an identification unit disposed at or above a height of the tray. In another illustrative embodiment, the autonomous feeding device includes one or more processors and memory. In another illustrative embodiment, the one or more processors are configured to execute a set of program instructions stored in the memory. In another illustrative embodiment, the set of program instructs are configured to cause the one or more processors to receive a signal indicative of an identification tag from the identification unit. In another illustrative embodiment, the set of program instructs are configured to cause the one or more processors to determine an animal associated with the identification tag is eligible for feeding based on a feed history associated with the identification tag and a feed schedule of a feed routine. In another illustrative embodiment, the set of program instructs are configured to cause the one or more processors to cause the motor to rotate the auger for an amount of time in response to determining the animal associated with the identification tag is eligible for feeding. In another illustrative embodiment, the amount of time is based on an output feed amount of the feed routine. In another illustrative embodiment, the set of program instructs are configured to cause the one or more processors to update the feed history.

An autonomous feeding system is described, in accordance with one or more embodiments of the present disclosure. In one illustrative embodiment, the autonomous feeding system includes a server including a feed history and a feed routine. In another illustrative embodiment, the feed history is associated with an identification tag of an animal. In another illustrative embodiment, the feed routine includes a feed schedule and an output feed amount. In another illustrative embodiment, the autonomous feeding system includes a plurality of autonomous feed devices. In another illustrative embodiment, each of the plurality of autonomous feed devices include a bin defining an interior chamber for holding a feed. In another illustrative embodiment, each of the plurality of autonomous feed devices include a tray configured to receive the feed from the bin. In another illustrative embodiment, each of the plurality of autonomous feed devices include an auger disposed within a bottom portion of the interior chamber. In another illustrative embodiment, each of the plurality of autonomous feed devices include a motor coupled to the auger. In another illustrative embodiment, the motor is configured to rotate the auger for dispensing the feed from the bin to the tray. In another illustrative embodiment, each of the plurality of autonomous feed devices include an identification unit disposed at or above a height of the tray. In another illustrative embodiment, each of the plurality of autonomous feed devices include one or more processors and memory. In another illustrative embodiment, the one or more processors are configured to execute a set of program instructions stored in the memory. In another illustrative embodiment, the set of program instructions are configured to cause the one or more processors to receive the feed history and the feed routine from the server. In another illustrative embodiment, the set of program instructions are configured to cause the one or more processors to receive a signal indicative of the identification tag from the identification unit. In another illustrative embodiment, the set of program instructions are configured to cause the one or more processors to determine an animal associated with the identification tag is eligible for feeding based on the feed history associated with the identification tag and the feed schedule. In another illustrative embodiment, the set of program instructions are configured to cause the one or more processors to cause the motor to rotate the auger for an amount of time in response to determining the animal associated with the identification tag is eligible for feeding. In another illustrative embodiment, the amount of time is based on the output feed amount. In another illustrative embodiment, the set of program instructions are configured to cause the one or more processors to cause the server to update the feed history.

A method for autonomously feeding livestock animals is described, in accordance with one or more embodiments of the present disclosure. In one illustrative embodiment, the method includes receiving a signal indicative of an identification tag from an identification unit. In another illustrative embodiment, the method includes determining an animal associated with the identification tag is eligible for feeding based on a feed history associated with the identification tag and a feed schedule of a feed routine. In another illustrative embodiment, the method includes causing a motor to rotate an auger for an amount of time in response to determining the animal associated with the identification tag is eligible for feeding. In another illustrative embodiment, feed is dispensed from a bin to a tray in response to rotating the auger. In another illustrative embodiment, the amount of time is based on an output feed amount of the feed routine. In another illustrative embodiment, the method includes updating the feed history.

BRIEF DESCRIPTION OF THE DRAWINGS

The numerous advantages of the disclosure may be better understood by those skilled in the art by reference to the accompanying figures in which:

FIG. 1I illustrates a partial rear perspective view of a spout lid of the device, when the spout lid is in an open position, in accordance with one or more embodiments of the present disclosure;

FIG. 1O illustrates a top-view of the device including a second bin, in accordance with one or more embodiments of the present disclosure;

DETAILED DESCRIPTION OF THE INVENTION

Figure 1A:
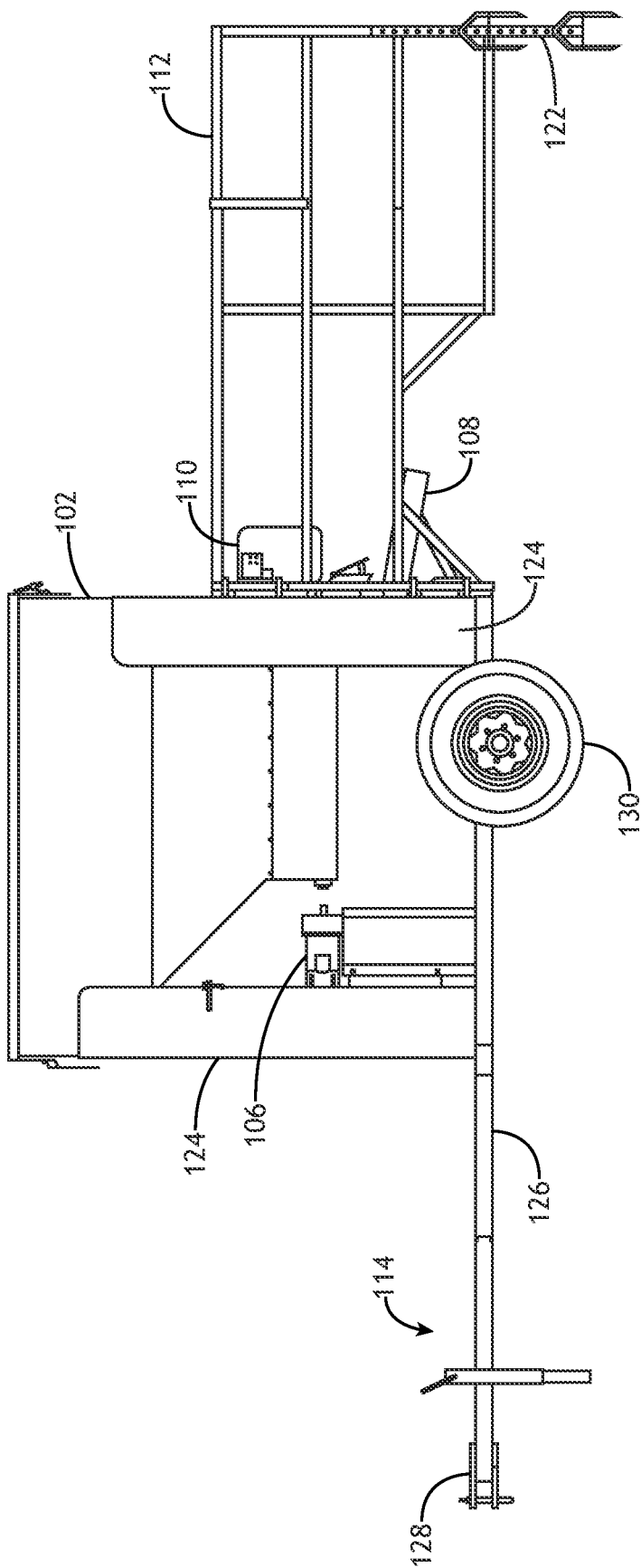
FIG. 1A illustrates a side profile view of an autonomous feed device, in accordance with one or more embodiments of the present disclosure.
Figure 1B:
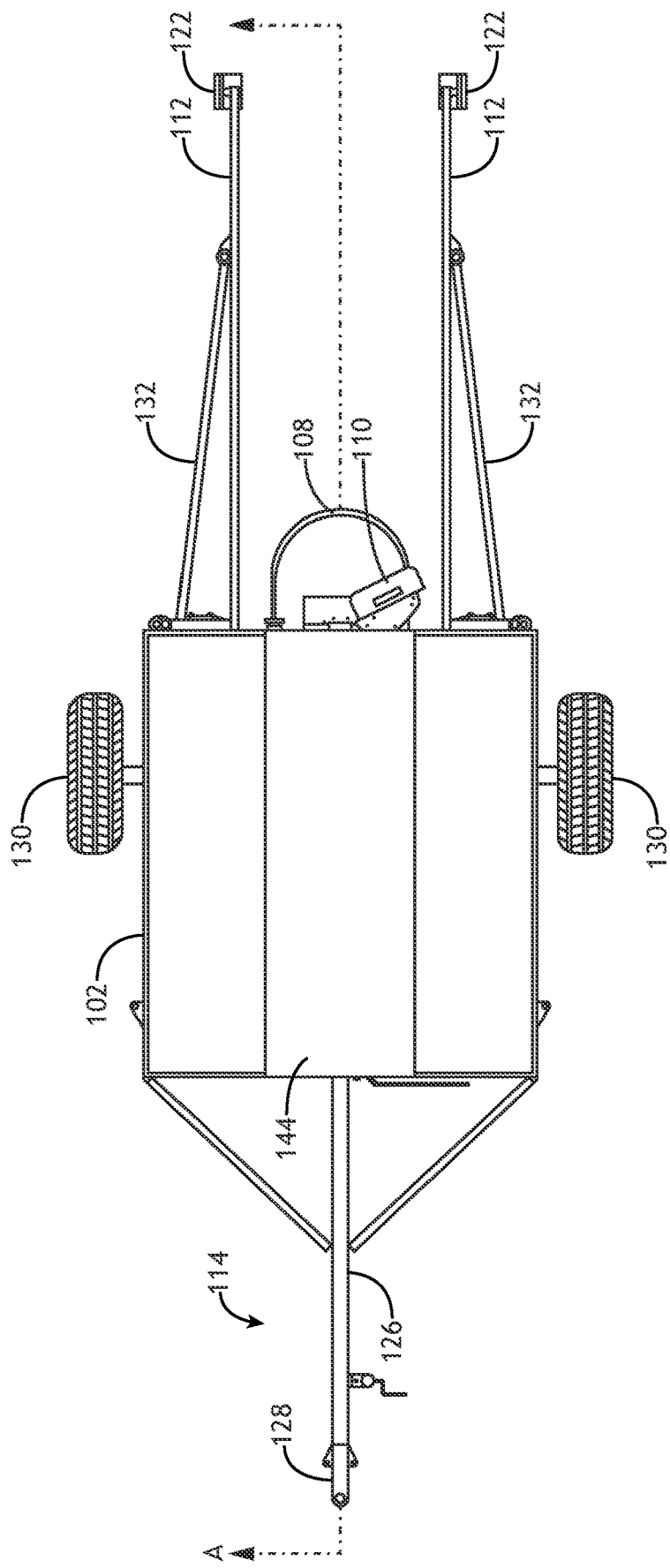
FIG. 1B illustrates a top view of the device, in accordance with one or more embodiments of the present disclosure.
Figure 1C:
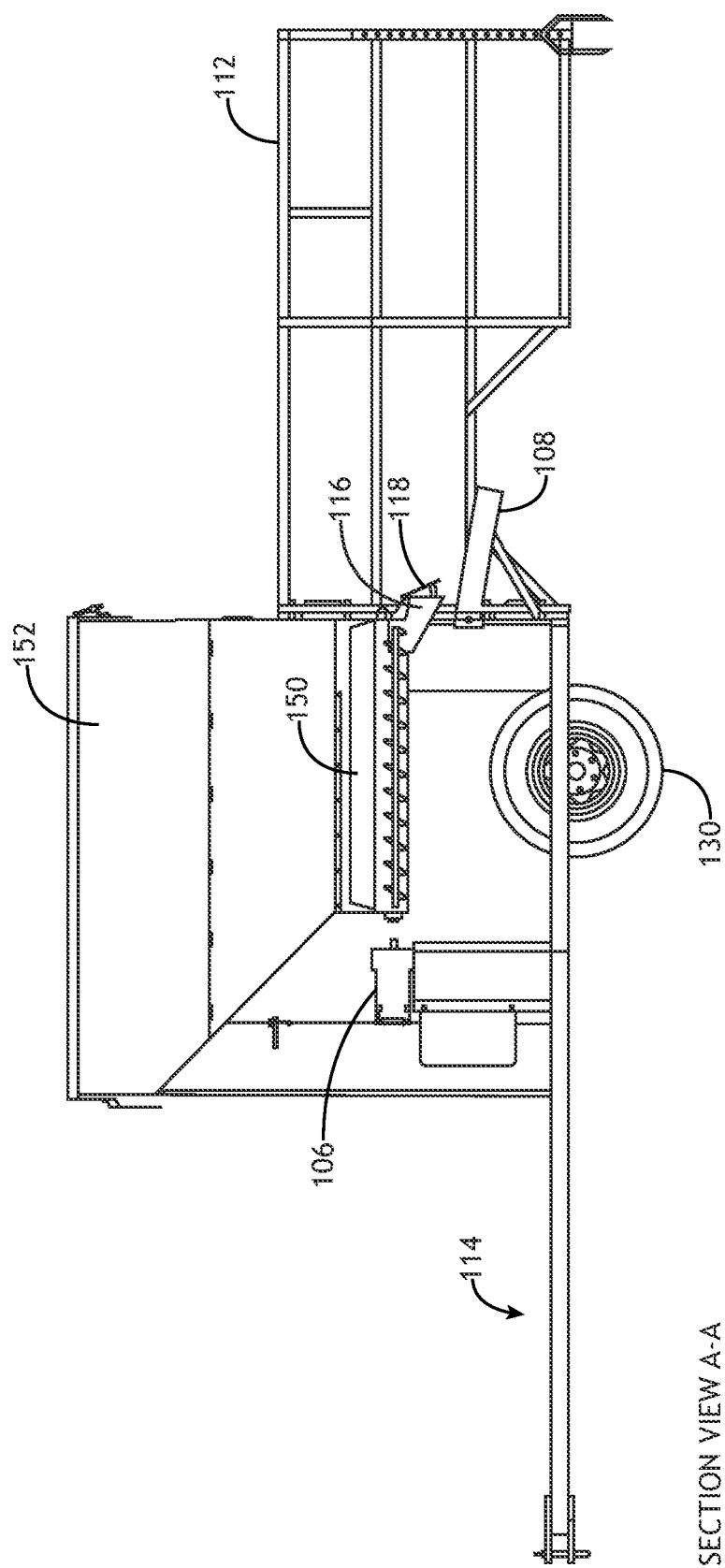
FIG. 1C illustrates a side section view of the device, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Referring generally to FIGS. 1A-5, an autonomous feeding device 100, an autonomous feeding system 200, and a method 500 for autonomously feeding livestock animals are disclosed, in accordance with one or more embodiments of the present disclosure. Embodiments of the present disclosure are directed to the autonomous feeding device 100 for selectively dispensing feed to a livestock animal, by an RFID tag associated with the animal. The device 100 may include a bin 102. The autonomous feeding device 100 may be filled with animal feed and placed at a location which is accessible by the animal. The autonomous feeding device 100 may have a feed routine enabled on a controller. The RFID tagged animal may approach the autonomous feeding device 100 and be dispensed a preset amount of feed from the bin 102, according to the feed routine. The autonomous feeding device 100 may additionally include one or more stall panels 112 to prevent more than one animal from feeding at a time. In this regard, each animal may be fed a preset amount of feed autonomously. The autonomous feeding device 100 may further log the feeding in a feed history associated with the animal's RFID tag number. The feed history may then be used to controlling future feedings. Embodiments of the present disclosure are also directed to the autonomous feeding system 200. The autonomous feeding system 200 may include one or more of the devices 100.

Figure 1D:
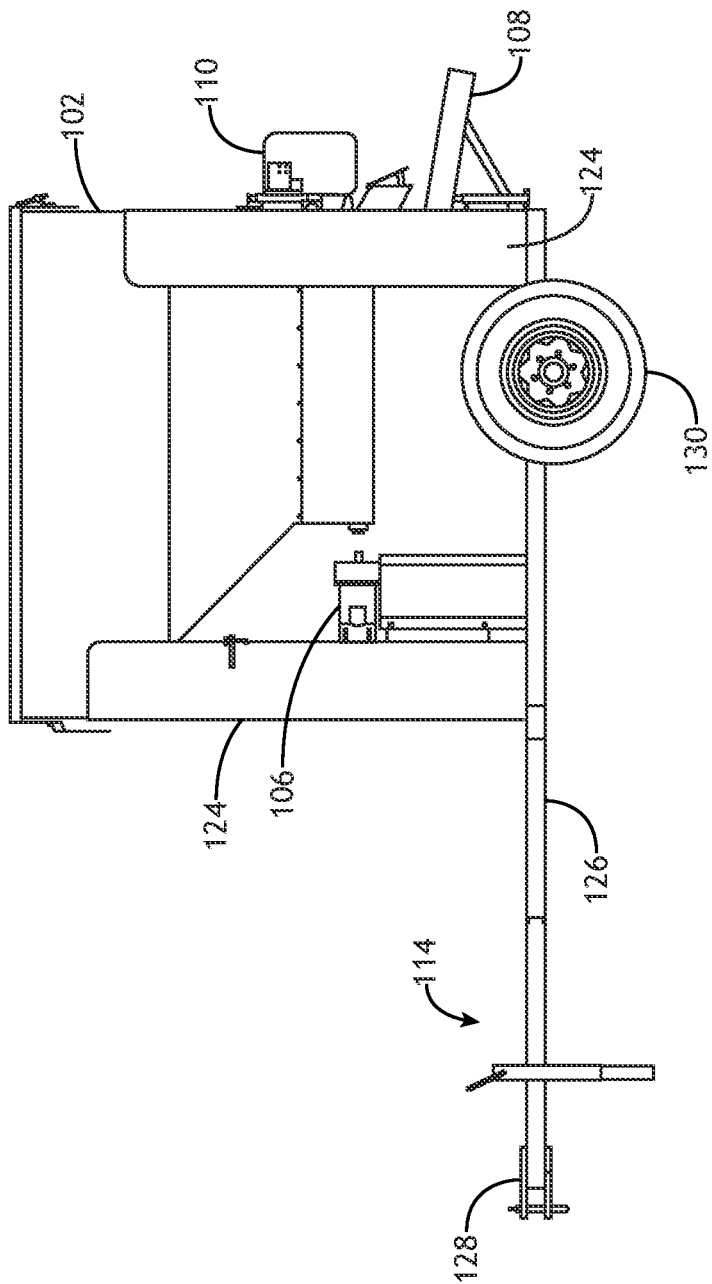
FIG. 1D illustrates a side profile view of the device with stall panels optionally removed, in accordance with one or more embodiments of the present disclosure.
Figure 1E:
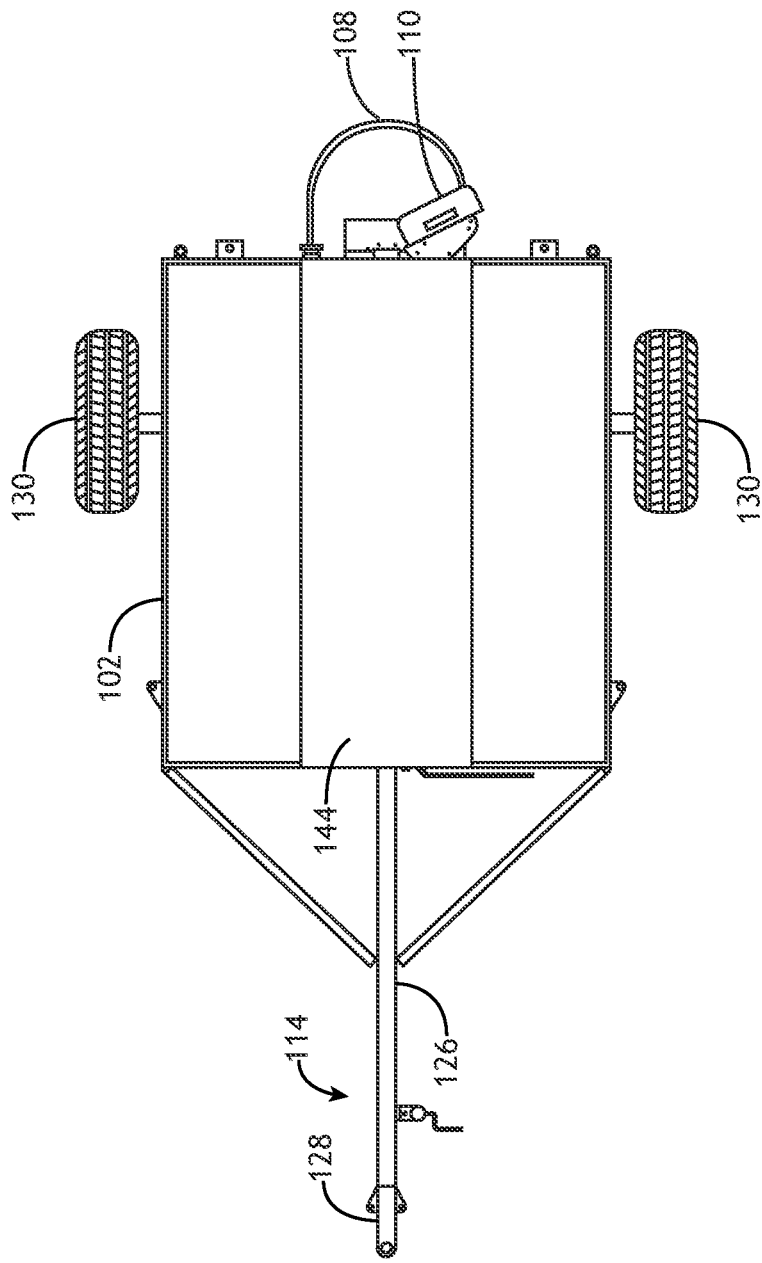
FIG. 1E illustrates a top view of the device with stall panels optionally removed, in accordance with one or more embodiments of the present disclosure.
Figure 1F:
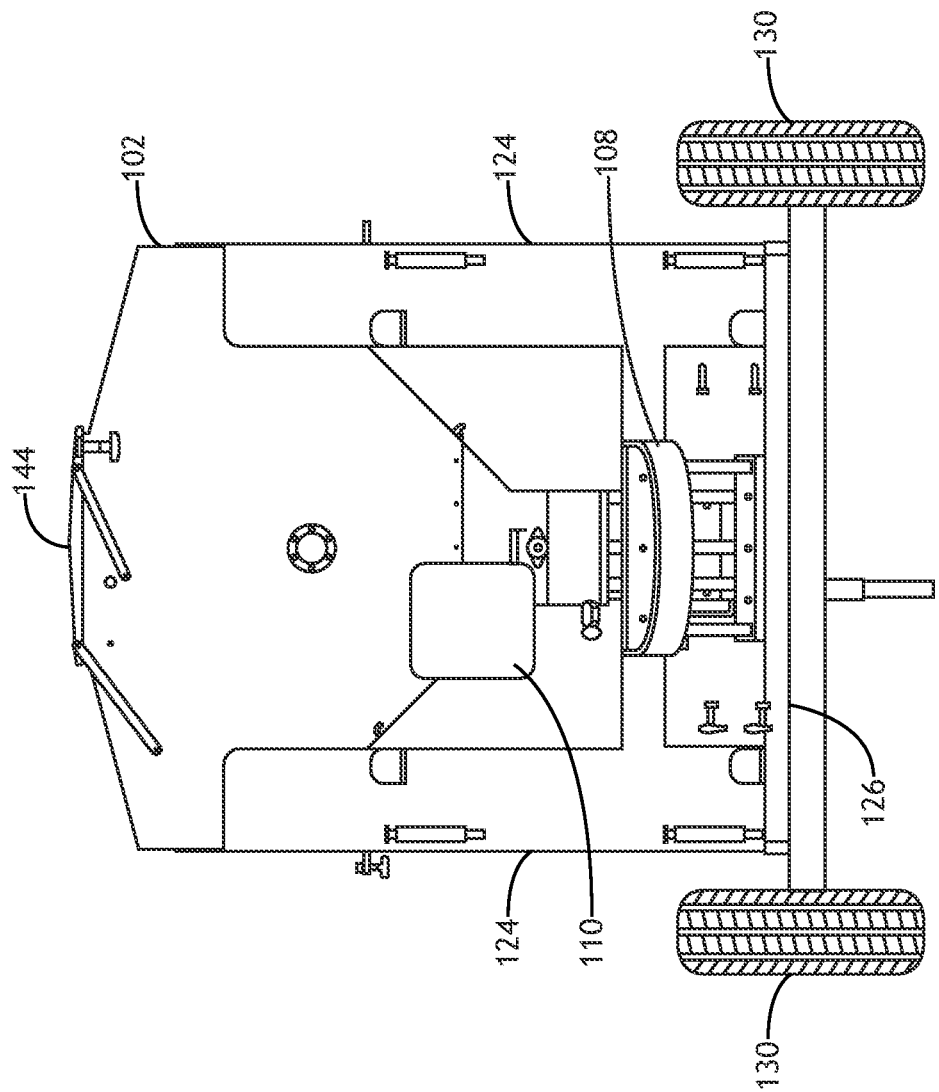
FIG. 1F illustrates a front view of the device with stall panels optionally removed, in accordance with one or more embodiments of the present disclosure.
Figure 1G:
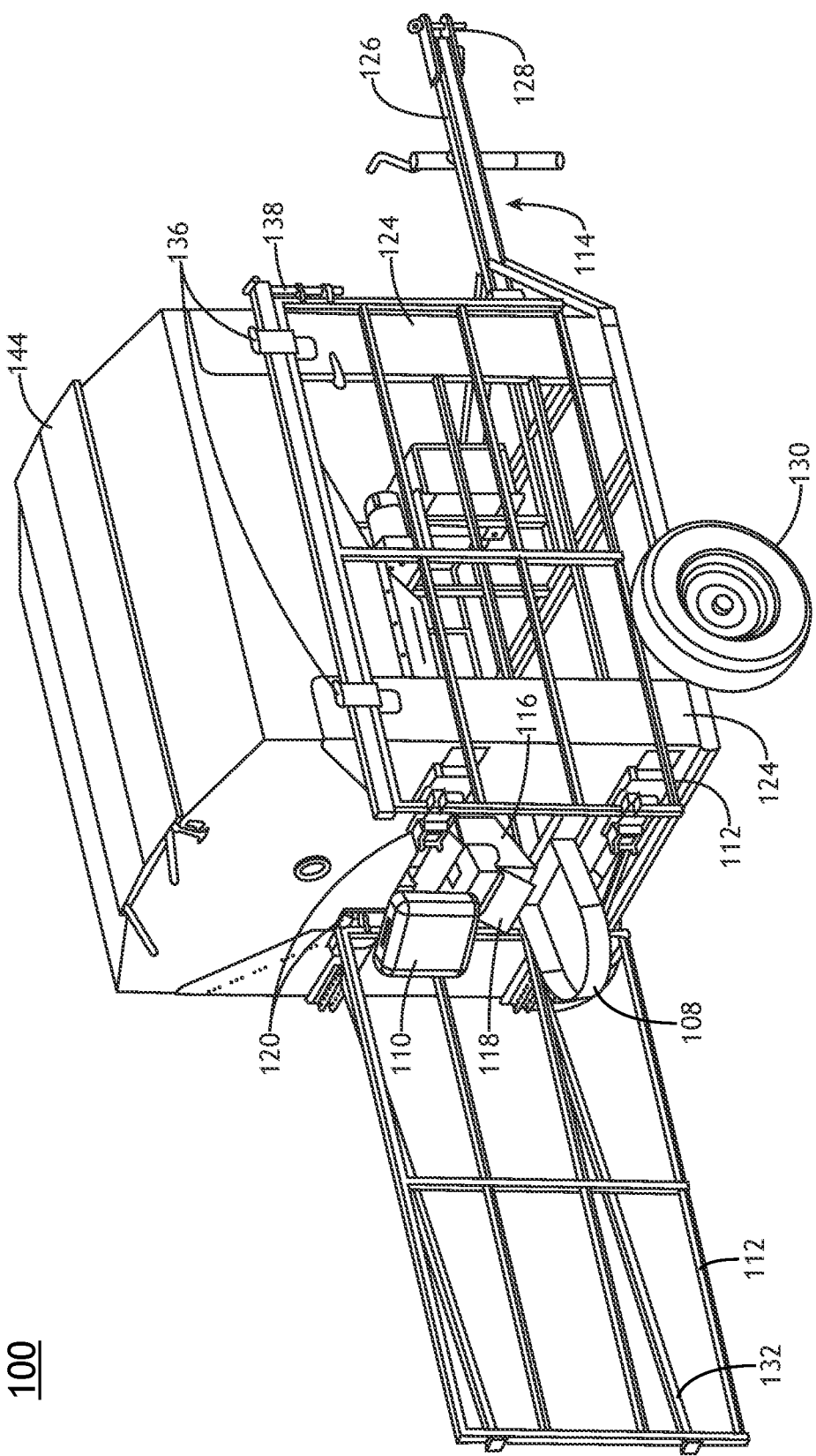
FIG. 1G illustrates a rear perspective view of the device with a right-side stall panel in a stowed position and a left-side stall panel in a deploy position, in accordance with one or more embodiments of the present disclosure.
Figure 1H:
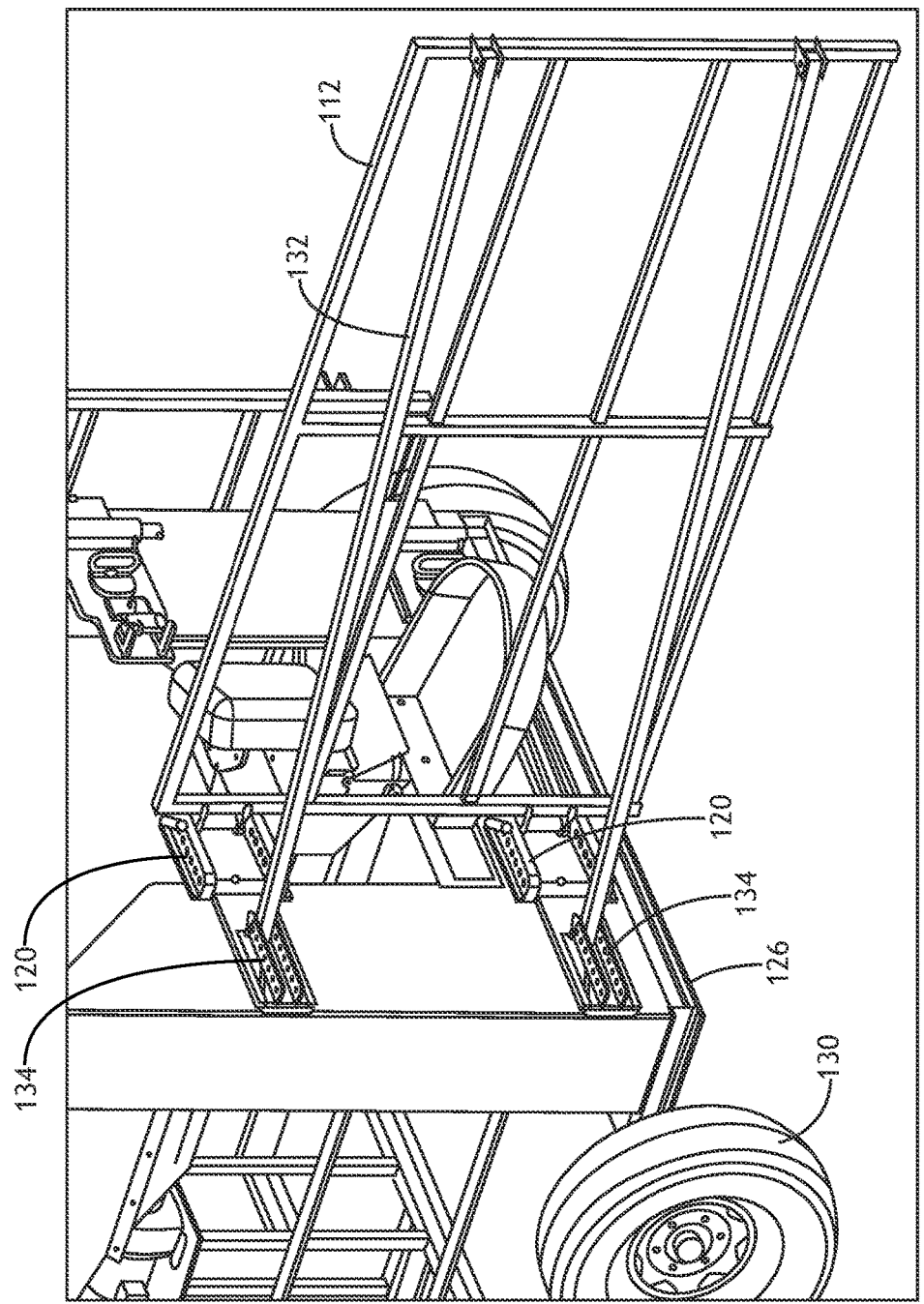
FIG. 1H illustrates a partial rear perspective view of the device with a right-side stall panel in a stowed position and a left-side stall panel in a deploy position, in accordance with one or more embodiments of the present disclosure.
Figure 11:
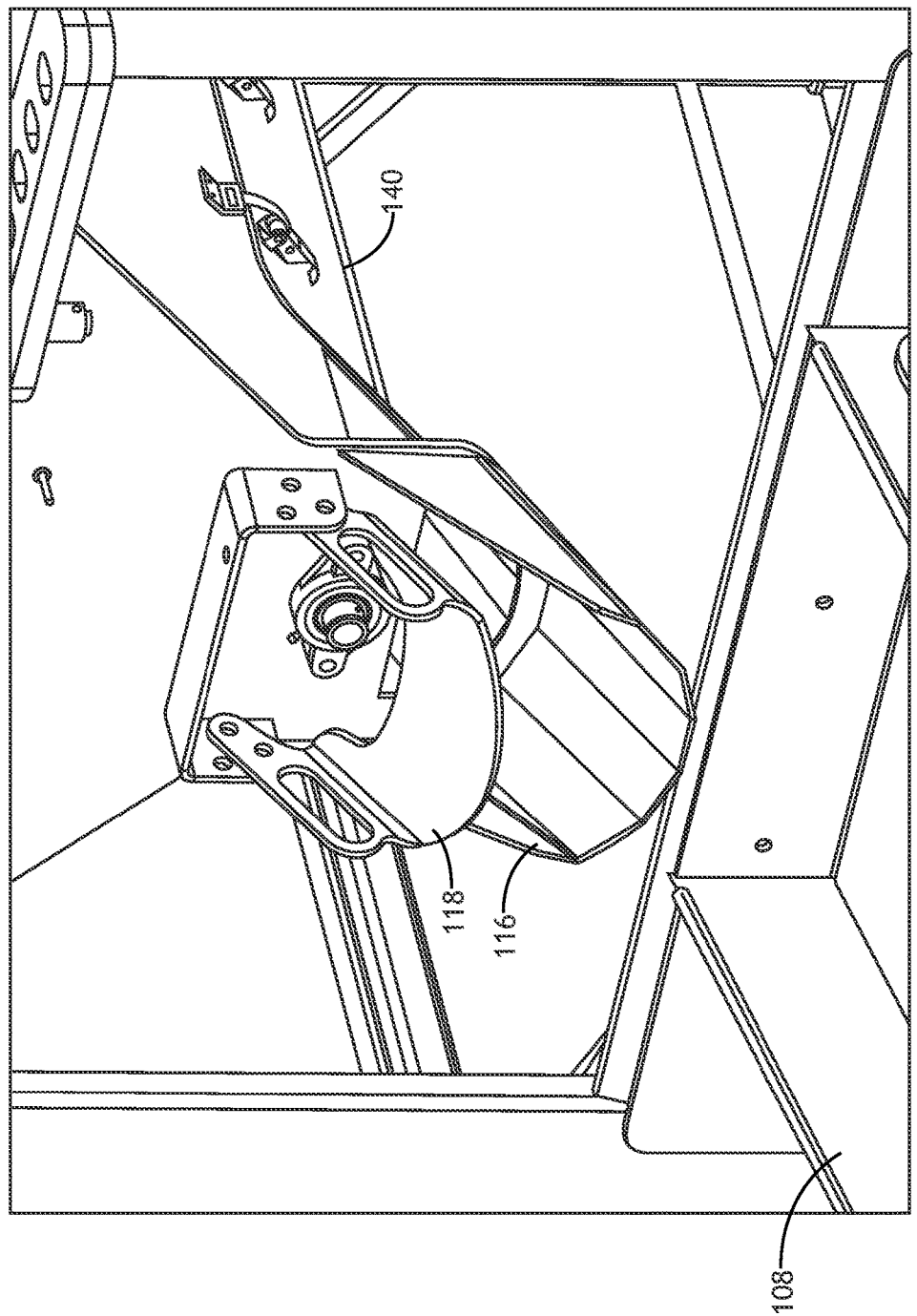
Figure 1J:
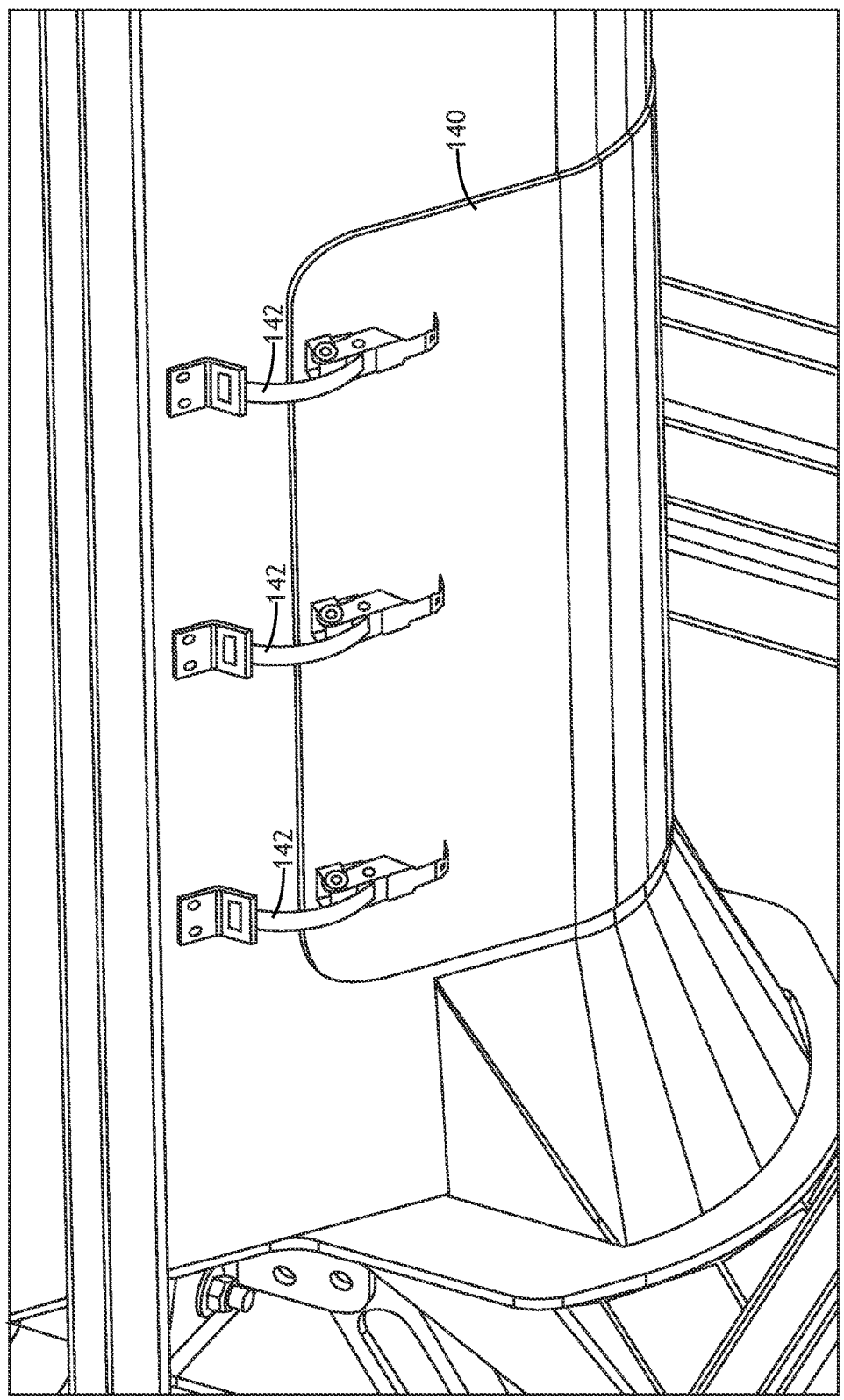
FIG. 1J illustrates a partial perspective view of an access panel of the device, in accordance with one or more embodiments of the present disclosure.
Figure 1K:
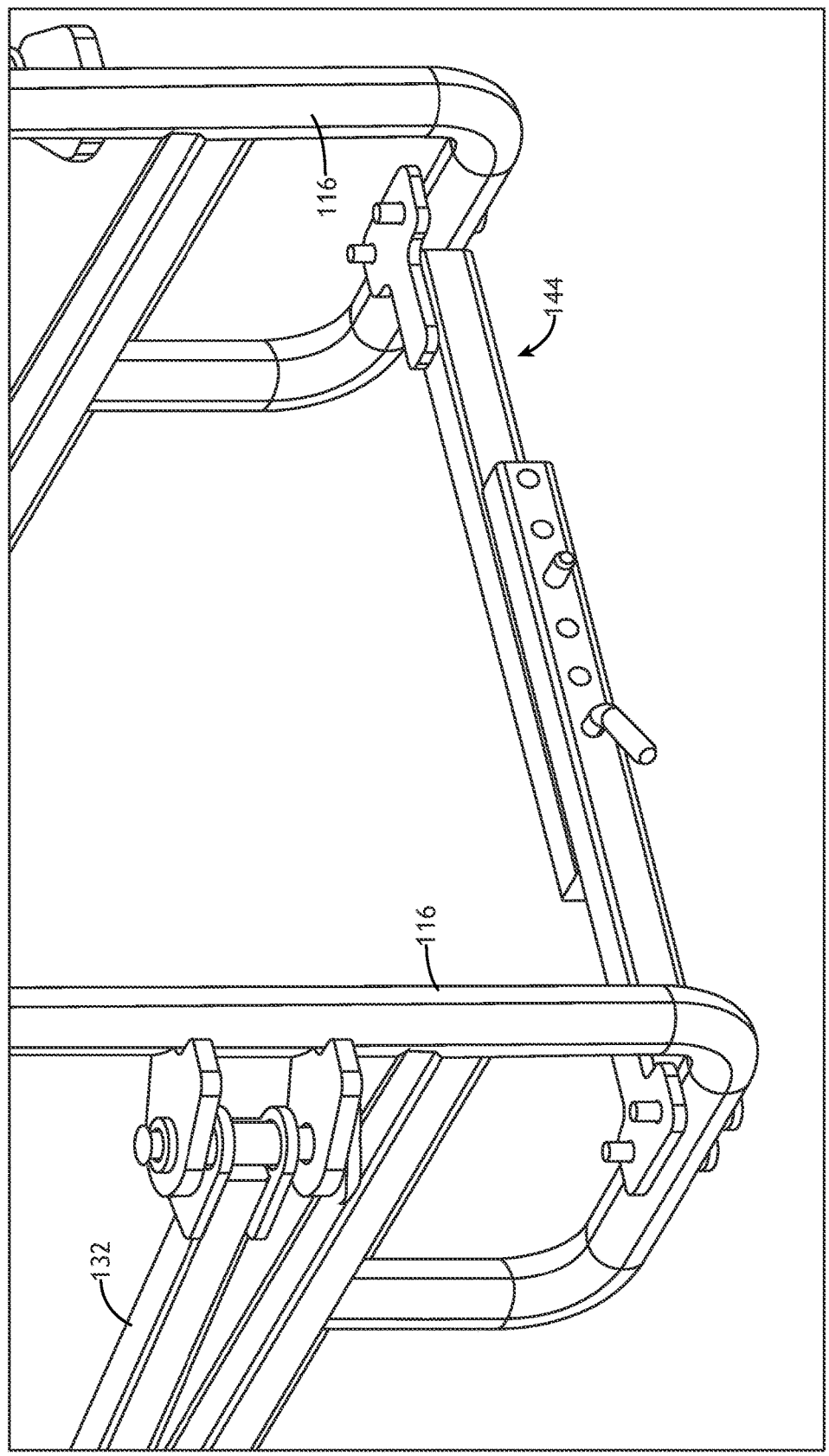
FIG. 1K illustrates a partial perspective view of a stall panel coupler of the device, in accordance with one or more embodiments of the present disclosure.
Figure 1L:
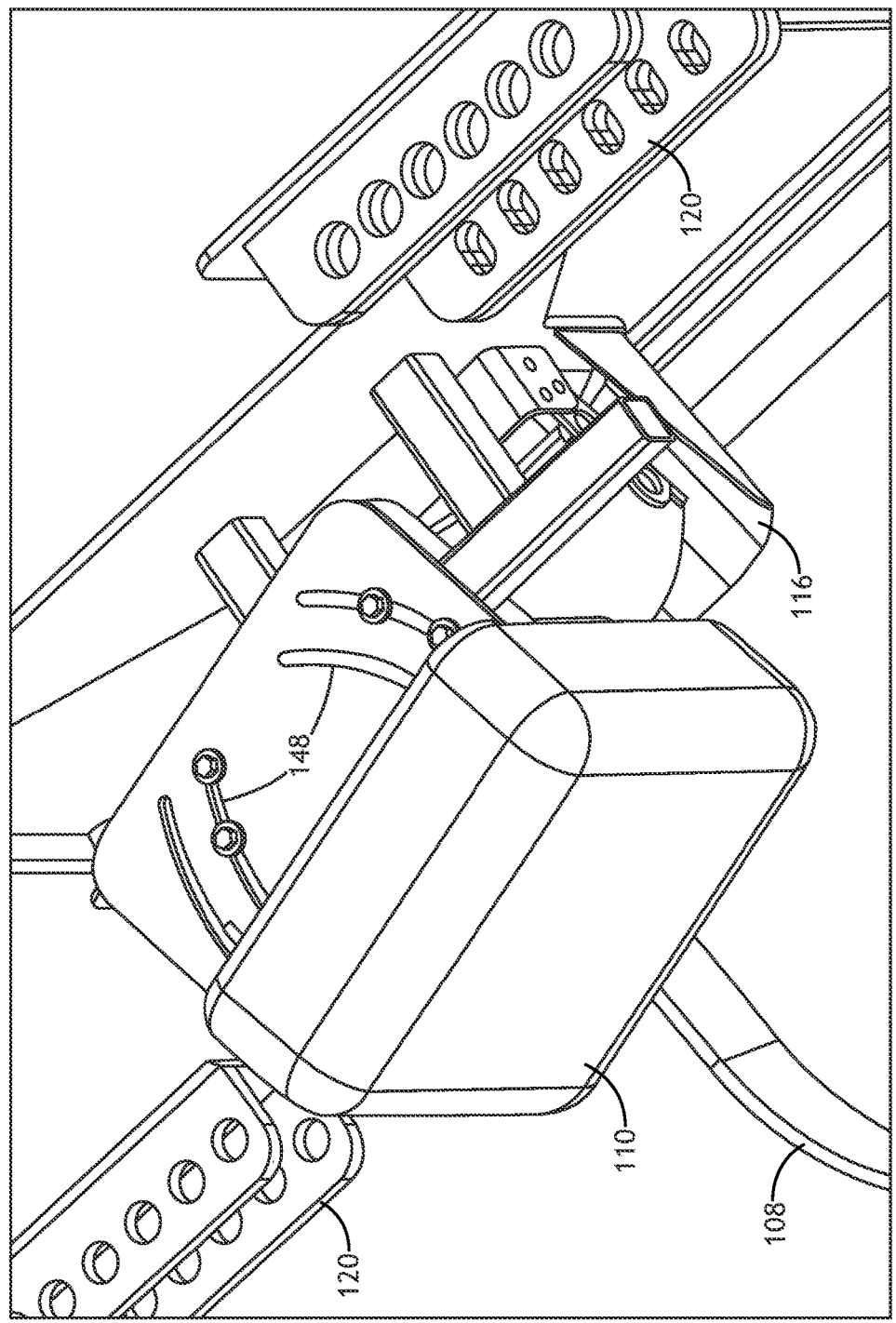
FIG. 1L illustrates a partial perspective view of an RFID reader of the device, in accordance with one or more embodiments of the present disclosure.
Figure 1M:
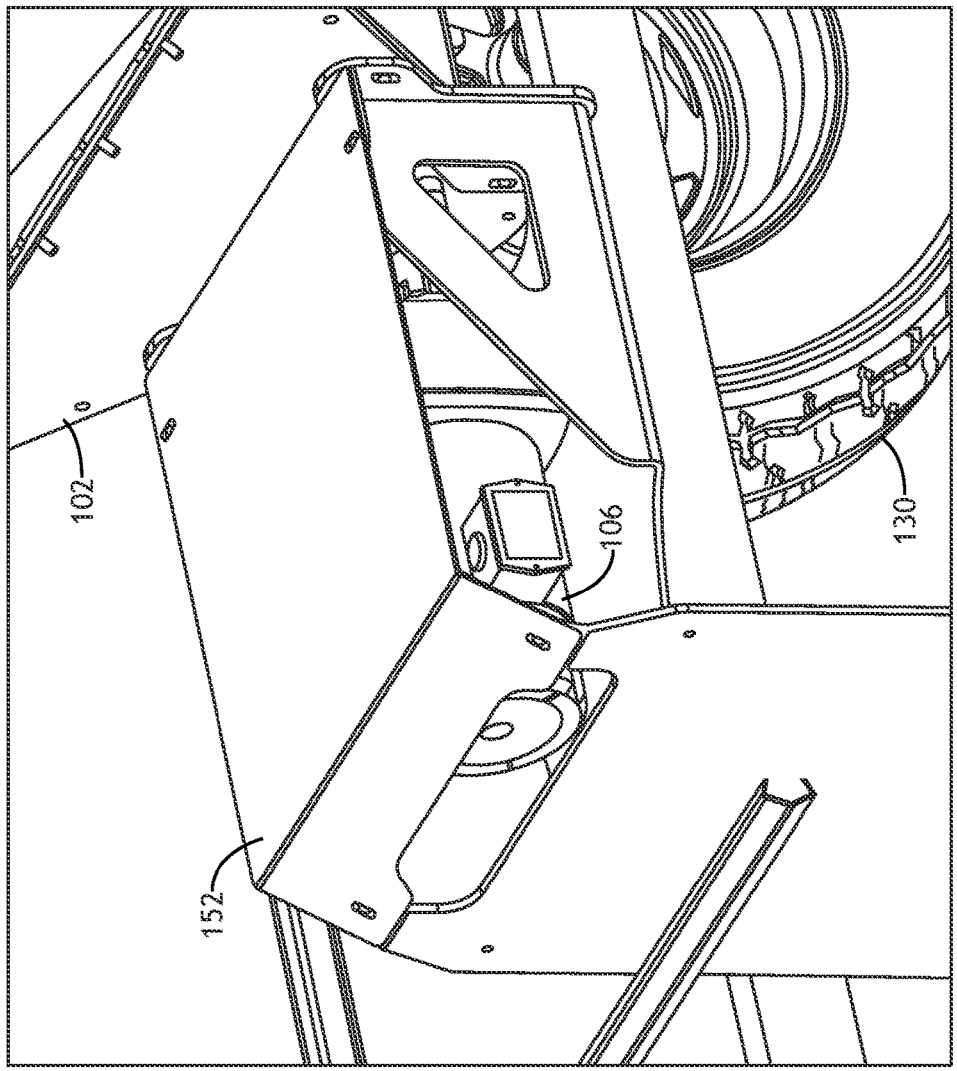
FIG. 1M illustrates a partial perspective view of a motor cover of the device, in accordance with one or more embodiments of the present disclosure.
Figure 1N:
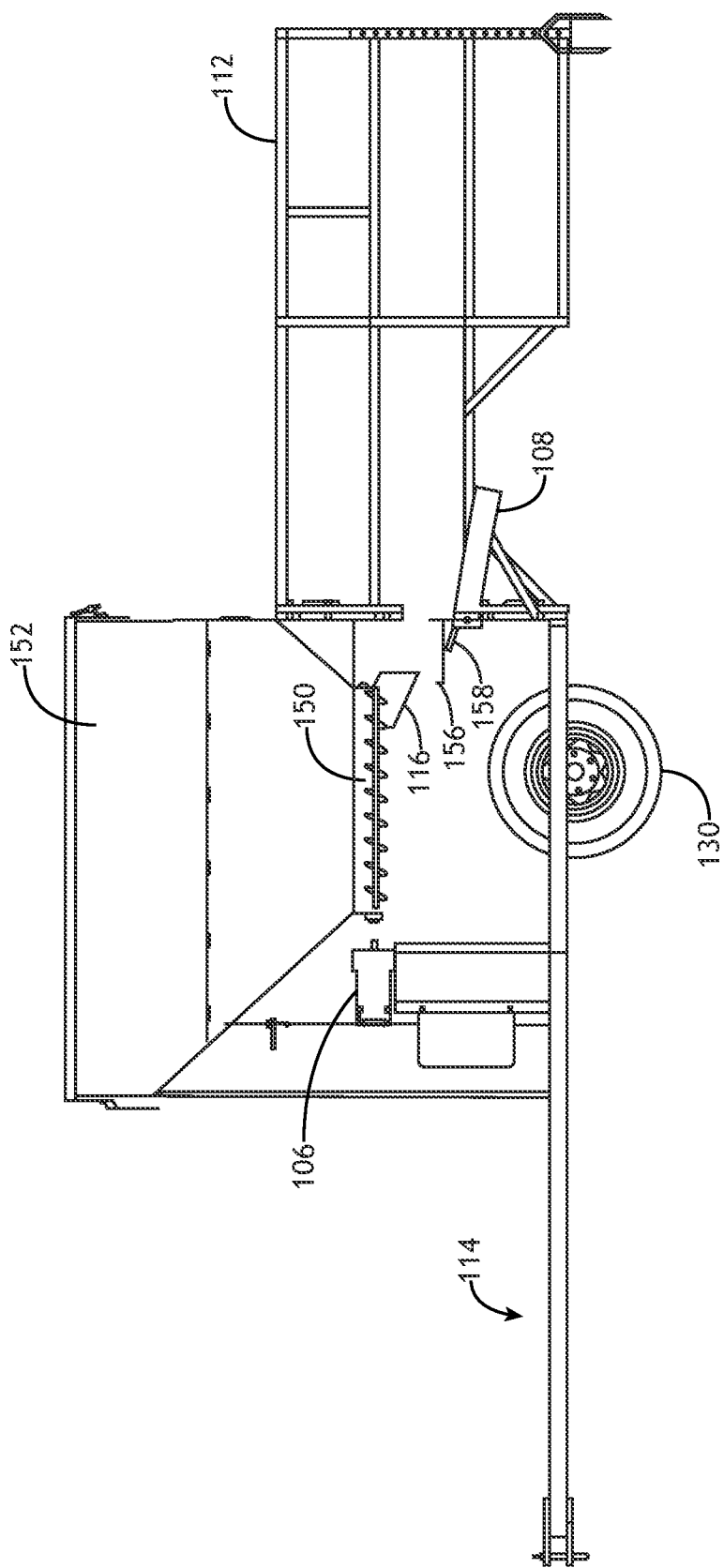
FIG. 1N illustrates a cross-section view of the device including a scale, in accordance with one or more embodiments of the present disclosure.
Figure 10:
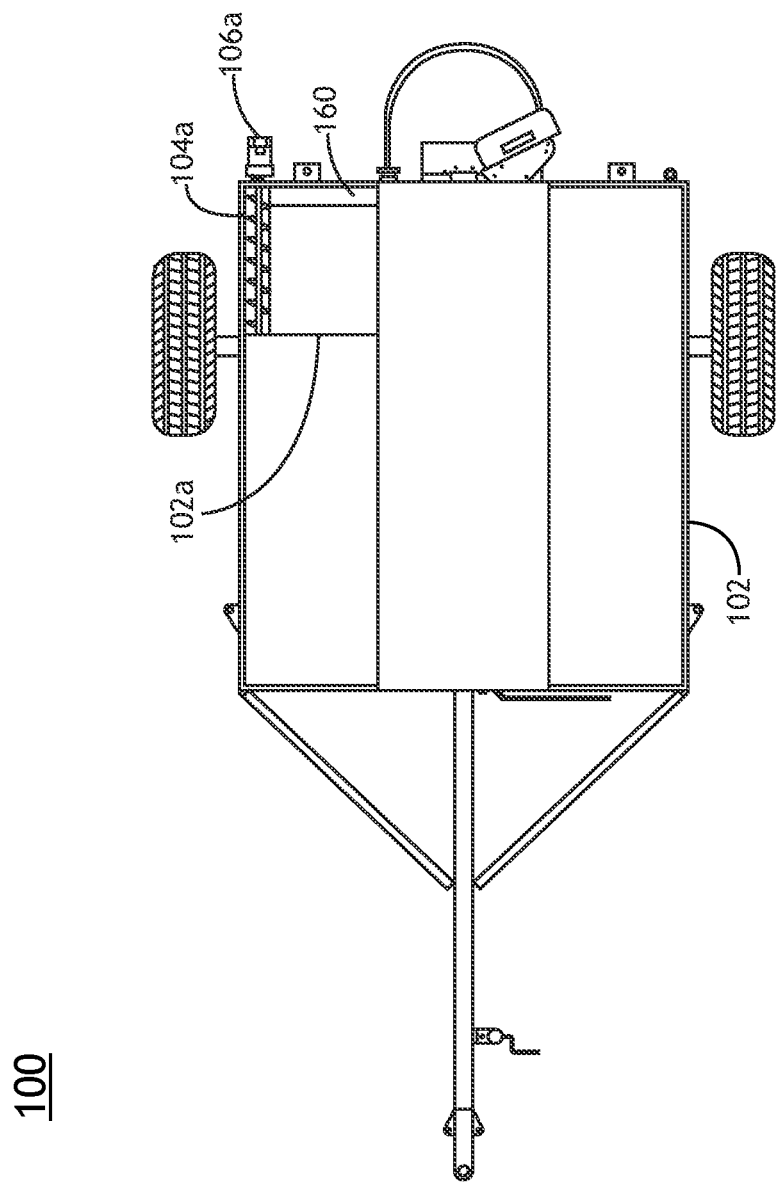
Figure 1P:
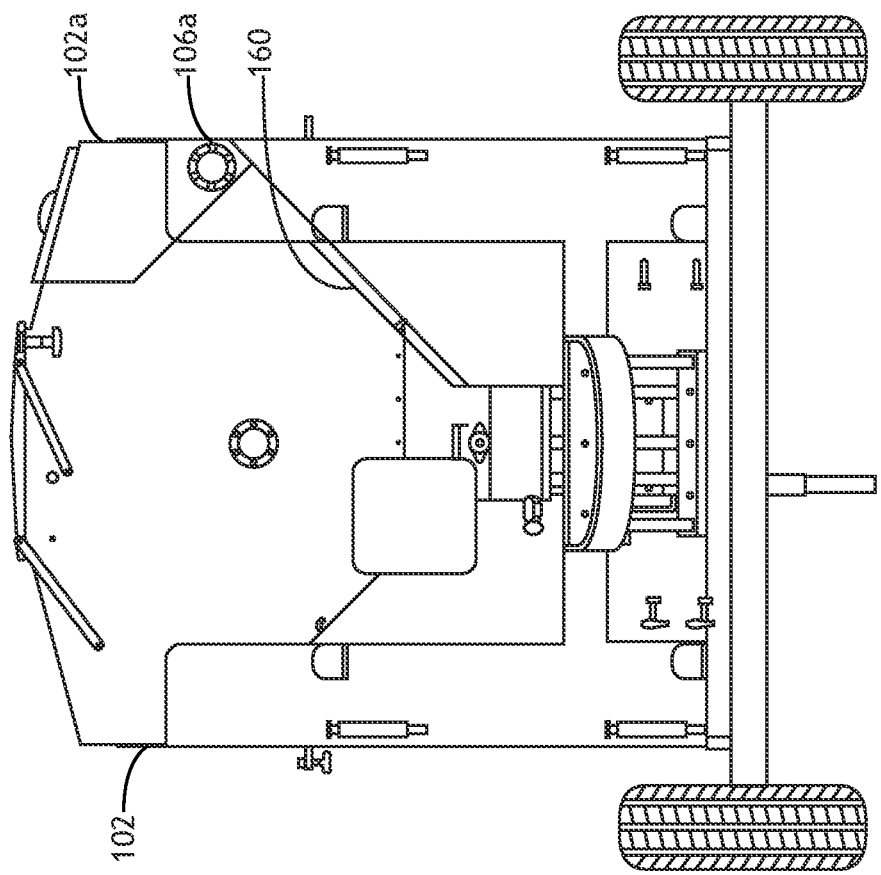
FIG. 1P illustrates a rear view of the device including a second bin, in accordance with one or more embodiments of the present disclosure.

FIGS. 1A-1P illustrates the autonomous feeding device 100 (also referred to as a hopper), in accordance with one or more embodiments of the present disclosure. In embodiments, the device 100 may include the bin 102, an auger 104 within a bottom portion of the bin 102, the motor 106 connected to the auger 104, a tray 108, an RFID reader 110, and one or more stall panels 112. The device 100 may further include a trailer 114, on which one or more components of the device 100 are mounted.

In embodiments, the device 100 includes a bin 102. The bin 102 may include one or more wall defining a top opening. By the top opening, the bin 102 is configured to receive feed. The one or more walls may also define an interior chamber 152 (see FIG. 1C). By the interior chamber 152, the bin 102 is configured to hold the feed. Feed held by the bin 102 may then be funneled to a bottom portion of the bin 102 by gravity. The walls of the bin 102 may include a taper which may provide a normal force on the feed, pushing the feed inwards in a funneling fashion, such that the bin 102 may be considered a wedge-shaped bin. The bin 102 may be supported by one or more leg members 124. The bin 102 may also include a lid 144, which covers the top opening. For example, the lid 144 may include a four-bar linkage assembly for holding the lid 144 open or closed. Feed may be loaded into the bin 102 by the top opening. The top opening may then be covered by the lid, to secure the feed when transporting the device 100, and protect the feed from rain water.

In embodiments, the device 100 includes the auger 104. The bin 102 may be configured to receive the auger 104 within and along the bottom portion of the interior chamber 152 of the bin (see FIG. 1C). As the auger 104 is rotated, blades of the auger 104 may transport feed along the bottom of the bin. As may be understood, the auger 104 may include any suitable auger for conveying feed or other bulk material. The device 100 may also include the spout 116. The auger 104 may convey feed from the bin 102 to the spout 116. The spout 116 may be disposed on a bottom edge of the bin 102. The spout 116 may include an angled portion for directing the feed towards the tray 108.

In embodiments, the device 100 includes the tray 108. The tray 108 may be configured to receive feed from the bin 102. For example, the tray 108 may receive the feed from the bin 102 by way of the spout 116. The tray 108 may be coupled to the leg members 124, such that the tray 108 is disposed below the spout 116. The tray 108 may include a variety of shapes, such as a square tray or a semi-circular tray. The tray 108 may be at a suitable height and angle from which a livestock animal may eat. For example, the tray 108 may be set at an angle relative to horizontal, thereby causing the feed to be gravity fed to a position closest to the livestock.

In embodiments, the bin 102 includes an auger shield 150. The auger shield 150 may be located within the bin 102 above the auger 104. The auger shield 150 may span a length and a width of the auger 104 or some portion of the length and width of the auger 104. By spanning at least, a portion of the length and width, the auger shield 150 may bear a portion of the feed weight in the bin 102. Such feed weight may then be transferred by the auger shield 150 to the walls of the bin 102, thereby reducing a weight on the auger 104. Reducing a weight of feed on the auger 104 may further improve the rate of feed dispensed by the auger 104 (e.g., by preventing feed from being jammed in the auger 104, as the auger 104 conveys feed to the spout 116). The auger shield 150 may be connected to the bin 102 by one or more brackets. The walls of the bin 102 may include a taper above the auger shield 150. In this regard, material held by the bin 102 is funneled down to and around the auger shield 602 by gravity. As may be understood, the auger shield 150 may be installed in a variety of configurations to shield the auger 104 from a portion of feed weight held by the bin 102. In embodiments, the auger shield 150 includes one or more bends. The auger shield 150 may include the one or more bends by a metal brake. The bend of the auger shield 150 may be concave or convex relative to the top of the bin 102. When the auger shield 150 is concave relative to the bin 102, a portion of the feed in the bin 102 may become trapped within the concave portion of the auger shield. The discussions of a concave and a convex auger shield are not intended to be limiting. In this regard, the auger shield 150 may be flat (e.g., with no bends). Such a flat auger shield may be connected to the bin 102 parallel to the ground or at an angle to relative to the ground. The ends of the auger shield 150 may also come to a triangle, square, semi-circle or other suitable shape (not depicted).

In embodiments, the device 100 includes a spout lid 118. The spout lid 118 may be configured to cover the spout 116. By covering the spout 116, The spout lid 118 may prevent feed from flowing to the tray 108. The spout lid 118 may be configured to cover the spout 116 by pinning the spout lid 118 to one or more holes of the spout 116. In this regard, the spout lid 118 may cover the spout 116 when the bin 102 is transported. The ability to cover the spout 116 by the spout lid 118 may be advantageous in providing an ability to pre-load the bin 102 with feed before reaching the feeding destination. The spout lid 118 may be oriented in a substantially vertical direction when in the closed position. The spout lid 118 may also be configured to be in an open position, such that an opening of the spout 116. When the opening of the spout 116 is uncover, feed may then flow from the spout 116 to the tray. In this regard, the spout lid 118 may be in the open position when feeding the animals. For example, FIG. 1I depicts the spout lid 118 in the open position, such that an opening of the spout 116 is not covered by the spout lid 118.

In embodiments, the device 100 include a trailer 114. The trailer 114 may include a frame member 126 coupled to the bin 102. The trailer 114 may also include one or more wheels 130 coupled to the frame member 126. For example, the wheels 130 may be coupled to the frame member 126 by an axle, or the like. The leg members 124 may be coupled to the frame member 126. The trailer 114 may also include a hitch 128. The hitch 128 may include any suitable hitch, such as, but not limited to, a ball hitch, a pintle hook, a lunette ring, and the like. By connecting the hitch 128 to a vehicle, the trailer 114 may transport the bin 102 to various locations.

In embodiments, the device 100 includes one or more stall panels 112. The stall panels 112 may be coupled to one or more of the bin 102, the trailer 114, or the leg members 124. For example, the stall panels 112 may be coupled to the one or more of the bin 102, the trailer 114, or the leg members 124 by a pivotable connection 120. When connected to the pivotable connection 120, the stall panels 112 may extend from the rear of the bin 102 and be disposed adjacent to the tray 108. By being disposed adjacent to the tray 108, the stall panels 112 may be configured to restrict access to the tray for preventing multiple livestock from eating out of the tray 108 at the same time (e.g., only one animal at a time). The ability to prevent multiple livestock from feeding at the same time may increase a likelihood that each animal may eat the output feed without competition. The pivotable connection 120 may thus allow an angle of the stall panels 112 relative to the tray to be adjusted. The ability to adjust the angle of the stall panels 112 relative to the tray 108 may be advantageous in accommodating animals of differing widths. The pivotable connection 120 may include a number of pin holes, by which the stall panel 112 may be pinned to the pivotable connection 120. The stall panel 112 may thus be pinned to any one of the pin holes of the pivotable connection 120. The pivotable connection 120 may also include one or more of a knuckle joint, a hinge, a clevis rod end, and the like.

In embodiments, the stall panels 112 includes one or more telescoping legs 122. For example, the one or more telescoping legs 122 may telescope by having a square tube which fits inside of another square tube. Each of such square tubes may include a plurality of holes, such that a pin may be used to secure the square tubes together. In this regard, the telescoping legs 122 may telescope between a down position and an up position, wherein a weight of the stall panels 112 is supported by the telescoping legs 122 in the down position, thereby preventing the stall panels 112 from pivoting relative to the tray 108. Although the stall panels 112 are described as including telescoping legs 122, this is not intended as a limitation on the present disclosure. In embodiments, the device 100 includes a stall panel coupler 146 (see FIG. 1K). The stall panel coupler 146 may couple the stall panels 112, thereby preventing the stall panels 112 from pivoting relative to the tray 108. The stall panel coupler 146 may include two pieces of tube which is pinned or otherwise fastened together. In this regard, a length of the stall panel coupler 146 may be adjustable depending on the relative angles of the stall panels 112 (e.g., for accommodating animals of differing widths).

In embodiments, the stall panels 112 may be detached from the pivotable connection 120. By detaching the stall panels 112 from the pivotable connection 120, the stall panels 112 may be stored in a stowed position. While in the stowed position, the stall panels 112 may be disposed alongside the bin 102, with a portion of the stall panels 112 fitting over a wheel of the trailer 114 on which the device 100 is mounted. This configuration may be suitable for transporting the device 100 over local, state, and federal highways. The stall panels 112 may be held in the stowed position by one or more panel holder brackets 136. The panel holder brackets 136 may be coupled to the leg members 124. For example, the panel holder brackets 136 may be coupled to a side of the leg members 124 which is perpendicular to where the tray 108 is coupled. The stall panels 112 may also be secured in the stowed position by one or more pins 138. Upon reaching the feed location, the stall panels 112 may be attached to the pivotable connection 120, thereby extending along the tray 108. For example, FIGS. 1G and 1H depicts the stall panel 112 on the right side detached from the pivotable connection 120 and stowed in the panel holder brackets 136. FIGS. 1G and 1H further depicts the stall panel 112 on the left side attached to the pivotable connection 120. As may be understood, the stall panels 112 of the left side and right side may be provided in the same configuration (e.g., either both stowed, or both deployed), such that FIGS. 1G and 1H are not intended to be limiting.

In embodiments, the device 100 includes one or more panel support members 132. A first end of the panel support member 132 may be pivotably connected to the stall panel 112. The pivotably connection may constrain the stall panel 112, thereby preventing the stall panel 112 from pivoting. A second end of the panel support member 132 may be pivotably connected to the a pivotable connection 134. The pivotable connection 134 may be similar to the pivotable connection 120. However, the pivotable connection 120 may be disposed between the pivotable connection 134 and the tray 108. By the pivotable connection 120 and the pivotable connection 134, an angle of the stall panel 112 may be adjustable. The ability to adjust the angle of the stall panel 112 may be advantageous in configuring the device 100 for animals with different widths to eat from the tray 108. For example, different species of animals may include different widths. By way of another example, different breeds of animal may include different widths. By way of another example, animals may include different widths depending upon age or sex. In a similar manner to the stall panel 112, the panel support member 132 may be unpinned from the pivotable connection 134 and stowed in a stowed configuration along a side of the bin 102 (e.g., above the wheels 130).

Although the device 100 has been described as including one or more of the stall panel 112 and the panel support members 132, this is not intended as a limitation of the present disclosure. As depicted in FIG. 1D-1F, the device 100 may not include the stall panel 112 and the panel support members 132. However, it is contemplated that the stall panels 112 may be advantageous in preventing competition for feed in the tray 108.

In embodiments, the bin 102 includes an access panel 140 or clean-out panel. The access panel 140 may be disposed below the auger 104. The access panel 140 may be configured to provide access to the interior chamber 152 of the bin 102. In particular, a human operator may stand below the bin 102 and access a bottom portion of the interior chamber 152 by the access panel 140. The ability to access the bottom portion of the interior chamber 152 from the underside of the bin 102 may be advantageous in servicing the auger 104, such as to clean the auger 104 or perform other routine maintenance. The access panel 140 may include any suitable mechanism for coupling and uncoupling to the bin 102, such as, but not limited to, toggle clasps 142.

In embodiments, the auger 104 is connected to the motor 106. The motor 106 may have a speed controlled by one or more controllers (e.g., controller 202). A controlled rotation rate of the auger 104 may correspond to a rate of feed flow. The motor 106 may be powered by a power source, in accordance with one or more embodiments of the present disclosure. The motor 106 may be a variable speed or uniform speed. The use of a variable speed motor may allow the controller 202 to selectively adjust the auger 104 speed. The variable speed motor may include an adjustable speed drive, such as, but not limited to, a variable belt drive or a motor drive. For example, the motor drive may be used to selectively control an electricity provided to the motor 106 at any given time, in accordance with motor drive's known in the art. In this regard, the motor 106 may be used to provide control a rate of the auger, depending on the type of feed stored in the bin 102 (e.g., for corn, cubes, distillers, etc.). As may be understood, the motor 106 may include any electric motor known in the art.

In embodiments, the device 100 includes a motor housing 154. The motor housing 154 may house the motor 106 (see FIG. 1M). The motor housing 154 may then provide a coupling between the motor 106 and one or more of the bin 102 or the trailer 114.

In embodiments, the device 100 includes an identification unit, such as, but not limited to, a radio-frequency identification (RFID) reader 110. The RFID reader 110 may include any RFID reader, such as, but not limited to, a passive reader active tag (PRAT), an active reader passive tag (ARPT), or an active reader active tag (ARAT). The RFID reader 110 may read an identification tag, such as, but not limited to, an RFID tag which is tagged to an ear of an animal 226. The RFID reader 110 may generally be disposed at or above the tray 108. In this regard, the RFID tag, which is commonly fixed to an ear of the animal, will be generate an RFID tag reading when the head of the animal is disposed at the tray 108. The RFID reader 110 may then provide such RFID tag reading to a controller (e.g., controller 202). The controller 202 may then control the motor 106 to selectively rotate the auger 104 based on the RFID reading from an RFID reader 110. In this regard, feed may be autonomously dispensed to the tray 108 based on the RFID tag readings. In embodiments, the RFID reader 110 is coupled to one or more of the bin 102 or the leg members 124. As depicted in FIG. 1L, the RFID reader 110 is coupled to the bin 102 by one or more curved slots 148. The curved slots 148 may provide an ability to adjust an angle of the RFID reader 110.

As depicted in FIG. 1N, the device 100 may include one or more of a scale 156 or an actuator 158. The scale 156 may be provided in a flow path of feed from the bin 102 to the tray 108. For example, the feed may be provided from the spout 116 to the scale 156. In embodiments, the scale 156 includes one or more sensors (e.g., sensor 209). By the one or more sensors, a weight reading of the scale 156 may be received for determining an amount of feed on the scale 156. The amount of feed on the scale may similarly correspond to an amount of feed dispensed from the bin 102. In embodiments, the actuator 158 may be coupled to the scale 156. The actuator 158 may include any actuator known in the art, such as, but not limited to, a cylinder. Once the sensor readings from the scale 156 indicates a desired amount of feed has been dispensed from the bin 102, the actuator 158 may be engaged to lift the scale 156. By lifting the scale 156, a gravitational force may pull the feed from the scale 156 into the feed tray 108. Thus, actuator 158 may be controlled based on data from the scale 156, and in particular, the feed output may be selectively controlled according to one or more feed schedules.

As depicted in FIG. 1O-1P, the device 100 may include multiple bins. The device 100 may include the bin 102 and a bin 102a. The bin 102a may be disposed in an upper corner of the bin 102. The bin 102a may be gravity fed such that feed in the bin 102a is pulled to a lower portion of the bin 102a. The device 100 may further include an auger 104a disposed within the bottom portion of the bin 102a. The device 100 may further include a motor 106a coupled to the auger 104a and configured to rotate the auger 104a for dispensing feed from the bin 102a. In the configuration depicted, feed from the bin 102a may travel to the scale 156 by way of a chute 160 or may be dispensed directly to the tray. The ability to dispense the feed from the bin 102a to the scale 156 by way of the chute 160 may be advantageous in measuring a weight of the feed dispensed. The chute 160 may include a number of configurations, such as, but not limited to disposed within the walls of the bin 102 or disposed outside of the walls of the bin 102. Providing the chute 160 within the walls of the bin 102 may be advantageous in minimizing structural modifications performed on the bin 102. However, providing the chute 160 within the walls of the bin 102 may reduce a capacity of the bin 102. The bin 102a may also include a scale (not depicted) which is not shared with the bin 102, for measuring the weight of feed output from the bin 102a.

The device 100 may generally include any number of bins, such as, two or more bins. For example, a first bin may include a first type of feed and a second bin may include a second type of feed. As may be understood, the types of feed may include, but are not limited to, cubes or dry roll corn. The types of feed may also include a feed additive, such as, but not limited to a supplemental buffer (e.g., sodium bicarbonate, magnesium oxide, or the like). Each of the bins 102 may output the feed to the tray 108. Feed may then be selectively output from the bins 102 based on a selected feed ratio (e.g., grass, grain, and/or supplemental buffer treatment) from the bins 102. In this regard, a rancher may selectively control the ratios of feed output. The ability to selectively control the ratio of feed output may be advantageous in allowing a rancher to accommodate livestock according to health conditions associated with the livestock.

Although the bins 102 are described as including different types of feed or feed with different types of treatments, this is not intended as a limitation of the present disclosure. The bins 102 may also include the same type of feed, such that one or more of the bins 102 may act as a reserve bin, or the like.

Figure 2A:
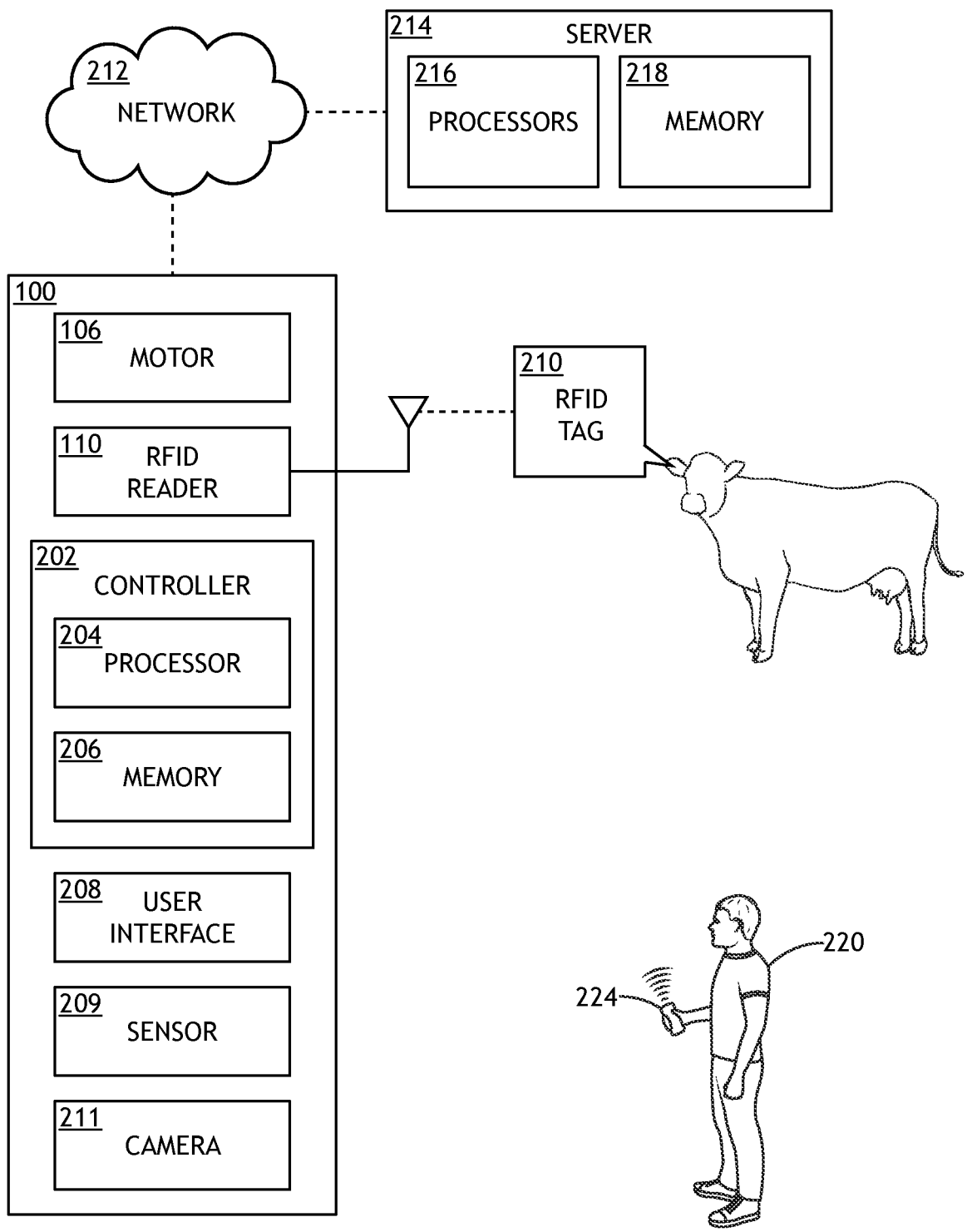
FIG. 2A illustrates a simplified schematic view of an autonomous feeding system, in accordance with one or more embodiments of the present disclosure.

FIG. 2A illustrates a simplified schematic view of an autonomous feeding system 200, in accordance with one or more embodiments of the present disclosure. The autonomous feeding system 200 may include one or more of the autonomous feeding devices 100, a network 212, one or more servers 214, and one or more user devices 224. In embodiments, the device 100 may include a controller 202. The controller 202 may be communicatively coupled to one or more of the motor 106, the RFID reader 110, or the sensor 209. The controller 202 may include one or more processors 204 and memory 206.

The one or more processors 204 of the controller 202 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 204 may include any device configured to execute algorithms and/or instructions (e.g., program instructions stored in memory). In one embodiment, the one or more processors 204 may be embodied as a desktop computer, mainframe computer system, workstation, image computer, parallel processor, networked computer, or any other computer system configured to execute a set of program instructions, as described throughout the present disclosure. Moreover, different subsystems of the device 100 or system 200 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 202 may include one or more controllers housed in a common housing or within multiple housings. In this way, any controller or combination of controllers may be separately packaged as a module suitable for integration into the device 100. Further, the controller 202 may analyze data received from the sensor 209 and feed the data to additional components within the device 100 or external to the device 100.

The memory 206 may include any storage medium known in the art suitable for storing program instructions executable by the associated one or more processors 204. For example, the memory 206 may include a non-transitory memory medium. By way of another example, the memory 206 may include, but is not limited to, a read-only memory (ROM), a random-access memory (RAM), a magnetic or optical memory device (e.g., disk), a magnetic tape, a solid-state drive and the like. It is further noted that memory 206 may be housed in a common controller housing with the one or more processors 204. In one embodiment, the memory 206 may be located remotely with respect to the physical location of the one or more processors 204 and controller 202. For instance, the one or more processors 204 of controller 202 may access a remote memory (e.g., server), accessible through a network (e.g., internet, intranet and the like).

In embodiments, a user interface 208 is communicatively coupled to the controller 202. The user interface 208 may include, but is not limited to, one or more desktops, laptops, tablets, and the like. In another embodiment, the user interface 208 includes a display used to display data of the device 100 to a user. The display of the user interface 208 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 208 is suitable for implementation in the present disclosure. In another embodiment, a user may input selections and/or instructions responsive to data displayed to the user via a user input device of the user interface 208.

In embodiments, the processors 204 may be configured to execute a set of program instructions maintained on the memory 206. In this regard, the one or more processors 204 of controller 202 may execute any of the various process steps described throughout the present disclosure. For example, the set of program instructions may cause the processor to receive a signal associated with an RFID tag 210 from the RFID tag reader 110, determine an animal associated with the RFID tag 210 is eligible for feeding, and/or control the motor 106 to rotate the auger for an amount of time in response to determining the animal associated with the RFID tag 210 is eligible for feeding. The controller 202 may determine the animal associated with the RFID tag 210 is eligible for feeding comparing a feed routine 228 (see FIG. 2B) with a feed history 236 (see FIG. 2C) associated with the RFID tag 210. The controller 202 may also update the feed history 236 with the current feeding.

The controller 202 may control the motor 106 in a number of configurations. These configurations are merely intended to provide examples and are not intended to be limiting. In embodiments, the controller 202 causes the motor 106 to rotate the auger 104 for a fixed amount of time and/or at a fixed preset revolutions per minute (RPM). In embodiments, the controller 202 uses a feed-forward control to determine how long and/or at what speed to cause the motor 106 to rotate the auger 104. The bin 102 may be configured to dispense a variety of feed types, including, but not limited to, cubes or dry roll corn. The memory 206 may include data indicative of a current feed type loaded in the bin 102. The memory 206 may also include a pre-set speed and/or duration at which to operate the motor 106 for the given feed type. In this regard, cube feed may require a longer run-time for the motor 106 to cause the auger 104 to deploy a similar weight of feed, as compared to dry roll corn feed. Similarly, the motor may be run at a higher RPM to dispense the cube feed for the same amount of time, as compared to dry roll corn feed. Thus, the controller 202 may selectively control the motor 106 by feed-forward control to accommodate for the type of feed in the bin 1022. In embodiments, the controller 202 uses feed-back control to determine how long and at what speed to cause the motor 106 to rotate the auger 104. Such feed-back control may be based on one or more sensor readings. For example, the device 100 includes one or more sensors 209. The one or more sensors 209 may be configured to measure various data, including, but not limited to, a feed weight in the bin 102 or a feed weight in the tray 108. Such sensors 209 may then provide the sensor data to the controller 202. By measuring a weight of feed in the tray 108 and/or a weight of feed in the bin 102, a feedback loop may be established with the controller 202. In this regard, the controller 202 may accurately dispense an output feed amount 232 by a feedback loop.

In embodiments, the device 100 includes the sensor 209. The sensor 209 may provide a signal indicative of feed weight in the bin 102 or the tray 104. The sensor 209 may be a pressure sensor or weight sensor located within the bin 102, the spout 116, or the tray 104. For example, the sensor 209 may provide sensor readings of the scale 156. The sensor 209 may provide the pressure or weight measurement (e.g., bin feed weight 234) to the controller 202. For example, the sensor 209 may determine when feed is added to the bin 102 or when feed is dispensed from the bin 102. The controller 202 may then display the bin feed weight 234 based on the weight measurement. In this regard, a user 220 may determine whether to add more feed to the device 100 by the user device 224, without having to go to the device 100 and look at the amount of feed in the bin 102. Similarly, when an animal has been fed by the device 100 or when feed has been added to the bin 102, the weight sensor may determine a new weight measurement, and update the bin feed weight 234. The readings from the sensor 209 may also be used by the controller 202 for dispensing a select amount of feed in a feed-back loop, or the like.

In embodiments, the device 100 includes a camera 211. For example, the camera 211 may be configured to record each feeding. The device 100 may then store the image and/or video data in memory (e.g., memory 206 or memory 218) for storage and playback at a later date.

The system 200 may also include the server 214. The server 214 may include a processor 216 and a memory 218. The server 214 may be communicatively coupled to the controller 202 by way of a network 212. The server 214 may also include a cloud-based architecture. For instance, it is contemplated herein that the server 214 may include a hosted server and/or cloud computing platform including, but not limited to, Amazon Web Services (e.g., Amazon EC2, and the like). In this regard, device 100 may include a software as a service (SaaS) configuration, in which various functions or steps of the present disclosure are carried out by a remote server.

The system 200 may also include the user device 224. The user device 224 may be communicatively coupled to the controller 202 by way of the network 212. The user device 224 may include any user devices known in the art including, but not limited to, cell phones, smart phones, tablets, smart watches, personal computers, and the like. In embodiments, a user 220 may be associated with the user device 224. It is contemplated herein that the user device 224 may be configured to execute applications (e.g., "apps") configured to allow the user 220 (e.g., farmhand, rancher, etc.) to view, adjust, or modify one or more characteristics of device 100, such as a feed history or a feed routine.

The controller 202, the server 214, and the user device 224 may be configured to communicate via the network 212. The network 212 may include any wireline communication protocol (e.g., DSL-based interconnection, cable-based interconnection, T9-based interconnection, and the like) or wireless communication protocol (e.g., GSM, GPRS, CDMA, EV-DO, EDGE, WiMAX, 3G, 4G, 4G LTE, 5G, Wi-Fi protocols, RF, Bluetooth, and the like) known in the art. By way of another example, the network 212 may include communication protocols including, but not limited to, radio frequency identification (RFID) protocols, open-sourced radio frequencies, and the like. Accordingly, an interaction between the controller 202, the server 214, and/or the user device 224 may be determined based on one or more characteristics including, but not limited to, cellular signatures, IP addresses, MAC addresses, Bluetooth signatures, radio frequency identification (RFID) tags, and the like.

Figure 2B:
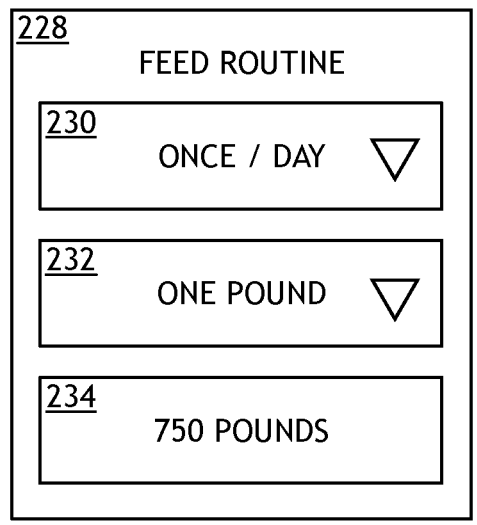
FIG. 2B illustrates a simplified graphical user interface of a feed routine of the system, in accordance with one or more embodiments of the present disclosure.

FIG. 2B illustrates a simplified graphical user interface of an exemplary feed routine 228 of the system 200, in accordance with one or more embodiments of the present disclosure. The feed routine 228 may include at least one of a feed schedule 230, an output feed amount 232, and a bin feed weight 234. The bin feed weight 234 may be determined by the sensor 209. One or more of the feed schedule 230 and the output feed amount 232 may be set by the user 220 (e.g., by the user device 224, by the user interface 208, by the server 214, etc.). As depicted in FIG. 2B, the feed schedule 230 and the output feed amount 232 may be set by a dropdown arrow, although this is not intended to be limiting. It is contemplated that a number of graphical control elements may be suitable for setting the feed schedule and the output feed amount 232, such as, but not limited to, a checkbox, a radio button, a textbox, a radio button, a slider, a list (e.g., a drop-down list), a scrollbar, and the like. The feed schedule 230 is set to once per day. If the animal has eaten during the current day, the controller 202 may determine that the animal is not eligible for feeding. The animal's feeding eligibility may reset at midnight. Such a once per day feeding schedule described is not intended to be limiting. In this regard, the feed schedule 230 may include, but is not limited to, multiple times per day, once a day, two times per day, or 6 times per week. In this regard, the user 220 may selectively control the times an animal is allowed to feed. The output feed amount 232 is set to one pound. When the controller determines the animal is eligible for feeding, the controller may active the auger to dispense the one pound of feed. The amount of feed is not intended to be limiting. In this regard, the output feed amount user 220 may selectively control the amount of feed to be dispensed per feeding.

The feed routine 228 may be stored in one or more of the memory 206 or the memory 218. The feed routine 228 may also be accessible by the user 220. In this regard, the user 220 may view the bin feed weight 234, change the feed schedule 230, and/or change the output feed amount 232. For example, the user 220 may access such information by the user device 224. By way of another example, the user 220 may access such information by the user interface 208 of the device 100. By way of another example, the user 220 may access such information by a web browser (e.g., where the information is accessible by a hypertext transfer protocol) with an internet network connection to the server 214.

In embodiments, the controller 202 is configured to selectively disburse feed based on one or more parameters of the feed routine 228. The parameters may include, but are not limited to, an animal age, animal sex, animal genetics, amount of feed remaining, or weather conditions (e.g., current weather or future weather). In this regard, the amount of feed disbursed may be tailored based on a number of factors associated with each animal.

Figure 2C:
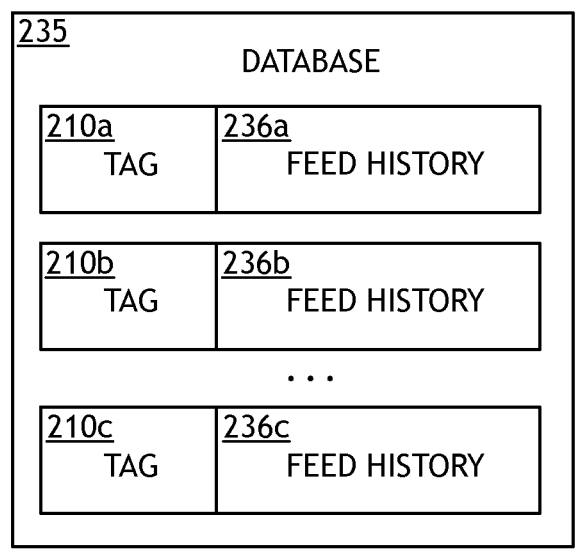
FIG. 2C illustrates a simplified graphical user interface of an RFID tag database, in accordance with one or more embodiments of the present disclosure.

FIG. 2C illustrates a simplified graphical user interface of a RFID tag database 235 of the system 200, in accordance with one or more embodiments of the present disclosure. The RFID tag database 235 may include a plurality of RFID tags 210a-210c. The database 235 may be maintained on the memory 206 or memory 218. Each RFID tag 210a-210c may have an associated feeding history 236-236c. As discussed previously, the controller 202 may receive a signal associated with an RFID tag 210 from the RFID reader 110.

The controller 202 may compare the signal associated with the RFID tag 210 to each of the RFID tags 210a-210c in the RFID tag database 235. As may be understood, any suitable comparison method may be used to perform the comparison, such as, but not limited to, a lookup table operation. Upon finding a matching RFID tag, the controller 202 may access the feed history 236 associated with the RFID tag 210 received from the RFID tag reader 110. One or more parameters of the RFID tag database 235 may be compared with one or more parameters of the feed routine 228 for determining the appropriate amount of feed to dispense, such as, but not limited to, the animal age, animal sex, animal genetics, or weather conditions.

In embodiments, the device 100 may be configured to read and store unknown RFID tags in the RFID tag database 235. These unknown RFID tags may then be displayed to the user 220 (e.g., by way of the user interface 208, the user device 224, or the web browser). By such display, the user 220 may be notified of a neighbor's animal being mixed with the herd. Furthermore, feed expenses may be reduced.

Table 1 illustrates an exemplary feed history 236a associated with RFID tag 210a of the system 200, in accordance with one or more embodiments of the present disclosure. The feed history 236a may include various data, such as, but not limited to, prior feeding dates 238, feeding times 240, feeding durations 242, an amount of feed dispensed 244, and an amount of feed eaten 246. When the animal is disbursed feed, the controller 202 may be configured to update one or more fields of the feed history 236, such as, but not limited to, the date 238, time 240, feed duration 242, feed dispensed 244, and feed eaten 246. As may be understood, the controller 202 may update the feed history 236 in any suitable manner, such as, but not limited to, storing the updated feed history 236 in the memory 206 and/or transmitting the one or more signals to the server 214, causing the server to update the feed history 236 in the memory 218.

TABLE 1

| DATE (238) | TIME (240) | DURATION (242) | DISPENSED (244) | EATEN (246) |
| --- | --- | --- | --- | --- |
| Sep. 28, 2020 | N/A | N/A | N/A | N/A |
| Sep. 27, 2020 | N/A | N/A | N/A | N/A |
| Sep. 26, 2020 | 12:02 P.M. | 62 SECONDS | 1 POUND | .9 POUNDS |
| Sep. 25, 2020 | 8:53 P.M. | 77 SECONDS | 1 POUND | 1 POUND |

In embodiments, the controller 202 is configured to determine the feed duration 242 based on the amount of time during which the animal is at the feed tray 108. For example, the RFID reader 110 may continuously read the RFID tag 210 while the animal is at the tray 108. Such RFID tag reading may be provided to the controller 202. The controller may then update the feed duration 242 field of the feed history 236.

In embodiments, the controller 202 is configured to determine the feed dispensed 244 based, at least, in part on the output feed amount 232. In embodiments, the controller 202 is configured to determine the feed dispensed 244 based, at least, in part on the sensor readings from the sensor 209. Based on the weight of feed dispensed to the tray 104 and a weight of left after the animal has left, the controller 202 may calculate an amount of feed eaten by the animal 246 and update the feed history 236. Furthermore, the controller 202 may account for the amount of feed remaining in the tray 108 when dispensing feed to the next animal. In embodiments, the controller 202 is configured to determine the feed dispensed 244 based, at least in part, on the feed history 236. The controller 202 may determines the animal has missed a feeding based on the feed history 236. For example, the animal may not be fed for several feeding periods (e.g., September $27^{th}$ and September $28^{th}$). By the missed feedings, the animal may be eligible for extra feed. In response to determining the missed feedings, the controller may increase the output feed amount. The controller 202 may then run the motor 106 for additional time or at an increased RPM to provide such extra feed to the animal 226.

Thus, the controller 202 may maintain the various fields of the feed history 236, including, but not limited to, the date 238, the time 240, the feed duration 242, the feed dispensed 244, and the feed eaten 246, as the livestock animal is fed by the device 100.

In embodiments, the controller 202 may update the feed history 236 if the signal associated with the RFID tag 210 is not dispensed feed during the feed schedule 230. If the animal has not eaten during the feed schedule 230, the controller 202 may provide an indication that the animal has missed a feeding. For example, table 1 includes several "N/a" values, indicating the animal associated with the RFID tag 210 has not eaten in two days. In embodiments, the controller 202 may update the feed history 236 if the signal associated with RFID tag 210 has been sensed multiple times during the feed schedule 230. In this regard, the animal may be trying to get more food than allotted. The ability to automatically notate missed feedings and extra feed attempts may be advantageous in reporting and diagnosing various health problems associated with the livestock animal.

At least one of the RFID tag database 235 or the feed history 236 may be accessible by or otherwise displayed to the user 220. For example, one or more of the RFID database 235 or the feed history 236 may be displayed to the user 220 by one or more of the user interface 208, the user device 224, or the web browser. The ability to display one or more of the RFID tag database 235 or the feed history 236 may allow the user 220 to determine whether an animal has missed one or more feedings. In this regard, the user 220 may determine that the animal associated with RFID tag 210a has missed feedings on September 27 and September 28, for example. Such missed feedings may indicate that something is wrong with the animal, such that the user 220 should check on the animal.

In embodiments, the device 100 includes multiple of the bins 102 and also includes sensors 209 (or scales) for each bin 102. Each of the sensors 209 may measure an amount of feed which is dispensed from the associated bin. The sensor readings may then be provided to the controller 202 for selectively dispensing feed according to a recipe (e.g., by a feed-back loop, or the like). For example, a first bin may include a first type of feed and a second bin may include a second type of feed. By the sensors 209 for each of the associated bins, the controller 202 may selectively output feed from each of the bins according to the feed routine. In this regard, the controller 202 may determine how much feed to output from each bin based on one or more of the feeding history, animal age, animal sex, animal genetics, amount of feed remaining the tray, weather conditions, and the like. For example, a rancher may identify an animal as being in an acidosis state. The feed routine 228 for the animal may be updated to indicate the animal is to receive a specific feed recipe. The specific feed routine may include a higher ratio of fiber to grain and/or additional feed which has been treated with a supplemental buffer. The controller 202 may then selectively dispense the ratio of feed (e.g., grass, grain, and/or supplemental buffer treatment) from the bins based on the sensor readings.

Figure 3:
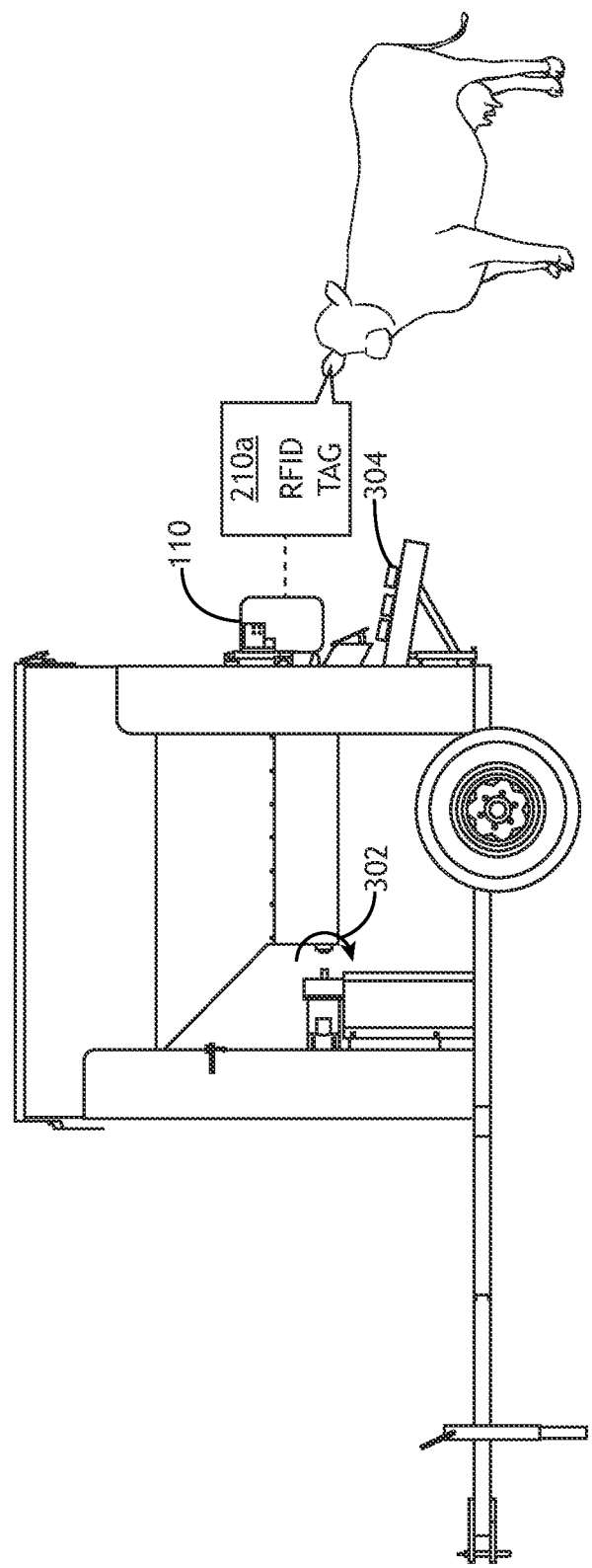
FIG. 3 illustrates a side view of the device depicting an exemplary feeding of an animal, in accordance with one or more embodiments of the present disclosure.

Referring to FIG. 3, an exemplary feeding of an animal is disclosed, in accordance with one or more embodiments of the present disclosure. As depicted in FIG. 3, RFID tag 210a is read by the RFID tag reader 110. The RFID tag reader 110 may provide a signal associated with the RFID tag 210 to the controller 202. The controller 202 may then determine a current date (September 29 in this example) and time. The controller 202 may also determine the feed history 236a associated with the RFID tag 210 (e.g., by way of the RFID tag database 235, see FIG. 2C). The controller 202 may also determine a feed schedule 230 (e.g., by way of the feed routine, see FIG. 2B). The exemplary feeding schedule is daily, with one pound of feed to be dispensed. The controller 202 may then compare the feed schedule 230, the current date and time, and the most recent feeding contained in the feed history 236 to determine whether the animal is eligible for feeding. In the example depicted, the animal is eligible for feeding, because the feed schedule 230 is once per day and the RFID tag 210a associated with the animal has no feed entries for the current date, such that the animal has not eaten in the last day. After determining an eligibility for feeding, the controller 202 may activate the motor 106 to rotate 302 the auger 104, thereby causing the auger 104 to dispense feed from the bin 102 to the tray 108 (e.g., cubed alfalfa 304).

Table 2 illustrates a feed history for the animal 226 associated with RFID tag 210a, updated based on the current feeding. The feed history 236 may be updated with data from the current feeding, such as, the date 238, time 240, duration 242, feed dispensed 244, and feed eaten 246. Thus, the controller 202 may maintain a feed history 236a for the animal associated with the RFID tag 210a. In this example, three pounds of feed has been dispensed to compensate for the previously missed feedings.

TABLE 2

| DATE (238) | TIME (240) | DURATION (242) | DISPENSED (244) | EATEN (246) |
|---|---|---|---|---|
| Sep. 29, 2020 | 10:01 A.M. | 153 SECONDS | 3 POUNDS | 2.3 POUNDS |
| Sep. 28, 2020 | N/A | N/A | N/A | N/A |
| Sep. 27, 2020 | N/A | N/A | N/A | N/A |
| Sep. 26, 2020 | 12:02 P.M. | 62 SECONDS | 1 POUND | .9 POUNDS |
| Sep. 25, 2020 | 8:53 P.M. | 77 SECONDS | 1 POUND | 1 POUND |

Figure 4A:
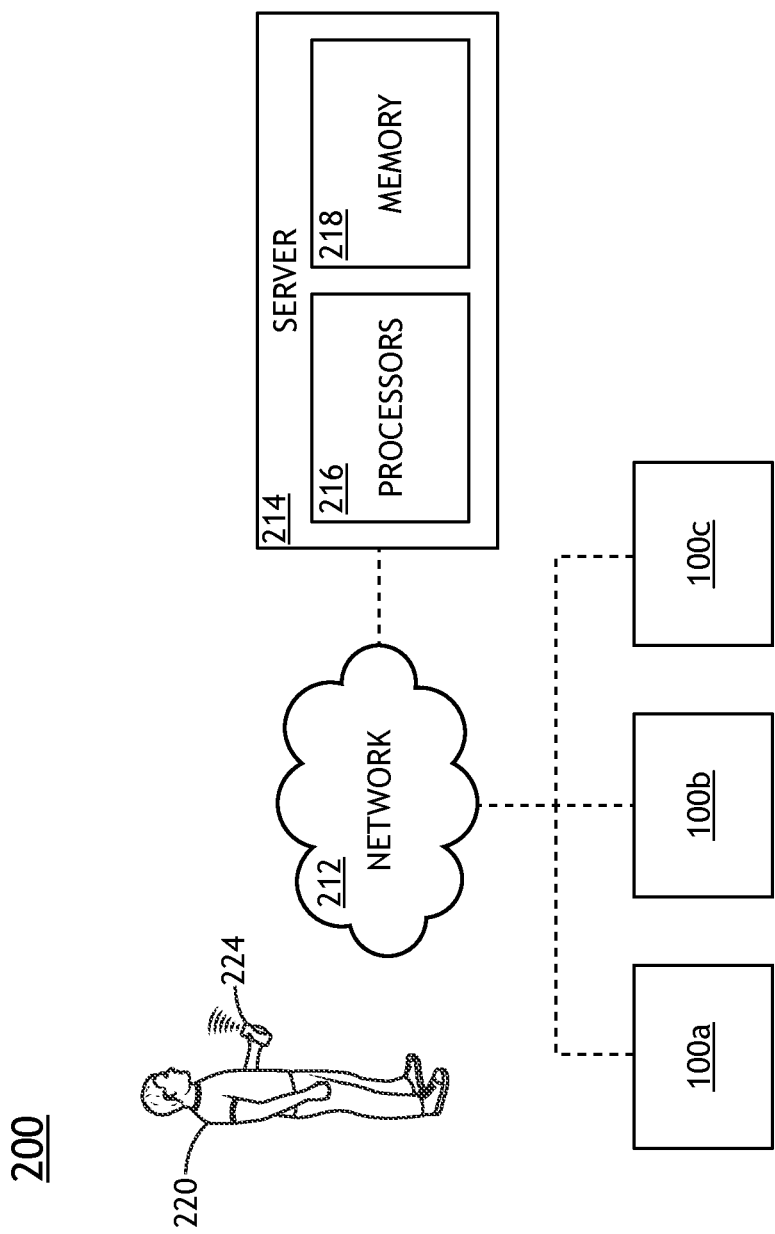
FIG. 4A illustrates a simplified schematic diagram of the system, in accordance with one or more embodiments of the present disclosure.
Figure 4B:
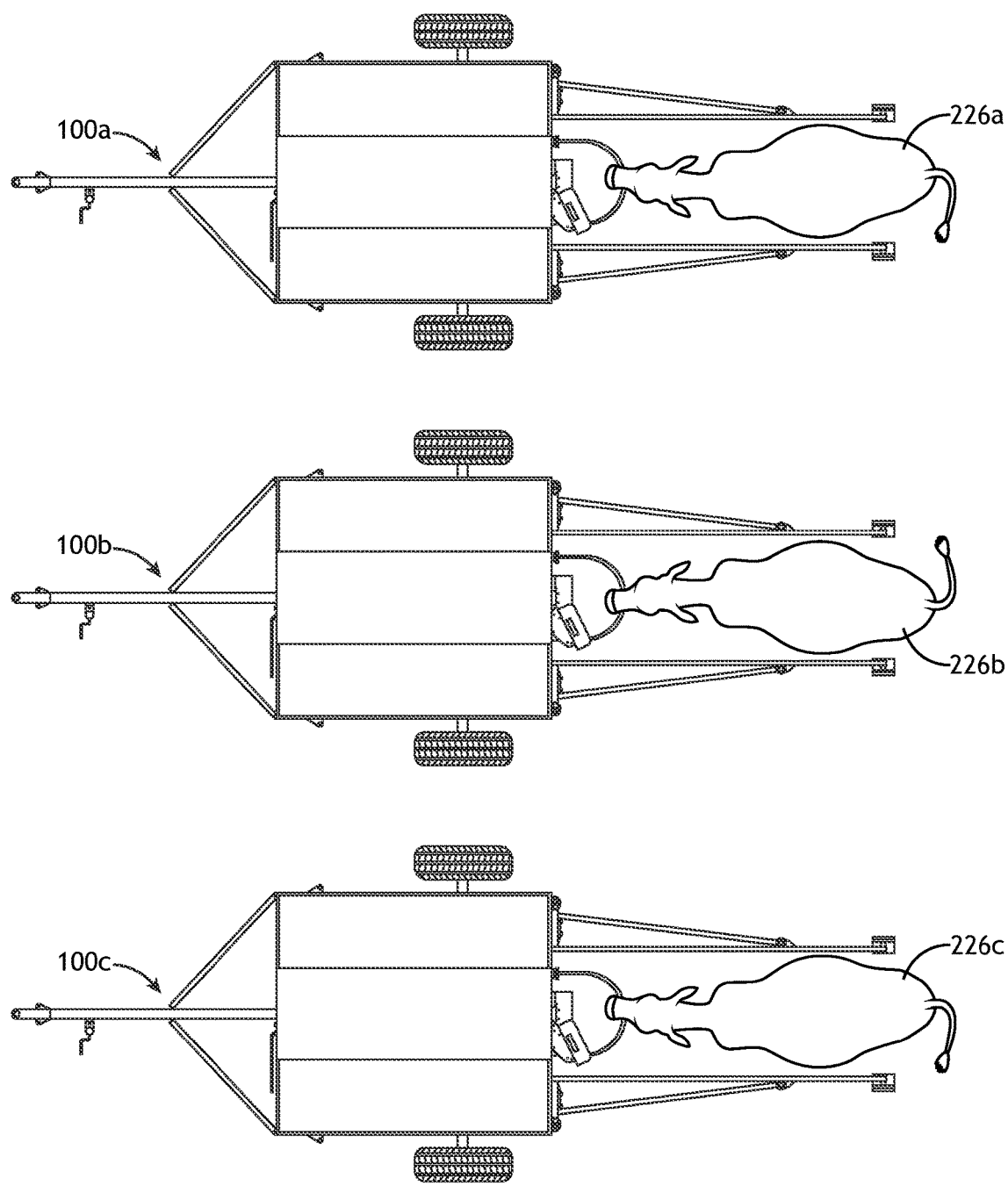
FIG. 4B illustrates a top view of the system, in accordance with one or more embodiments of the present disclosure.
Figure 4C:
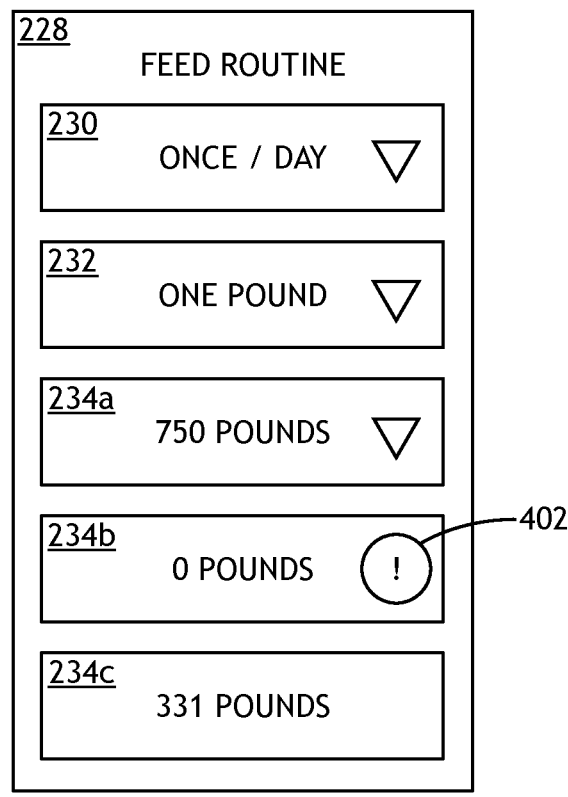
FIG. 4C illustrates a simplified graphical user interface of a feed routine of the system, in accordance with one or more embodiments of the present disclosure.

FIGS. 4A-4C illustrates a simplified schematic diagram of the autonomous feeding system 200 in accordance with one or more embodiments of present disclosure. In embodiments, the autonomous feeding system 200 may further include a plurality of the devices 100a-100c (e.g., multiple hoppers). The plurality of devices 100a-100c may communicate with the server 214, by the network 212, in accordance with one or more embodiments of the present disclosure. Similarly, the plurality of devices 100a-100c may communicate with the user device 224, in accordance with one or more embodiments of the present disclosure. The plurality of devices 100a-100c may also communicate with other by way of the network 212 (e.g., by one or more of Wi-Fi, Bluetooth, a hardline connection, etc.). Such communication between devices 100a-100c may include an asymmetric communication and control scheme (e.g., a primary and secondary configuration). In this regard, device 100a may be considered the primary device which controls the secondary devices 100c. Alternatively, the plurality of devices 100a-100c may include a symmetric communication and control scheme. In this regard, each of the devices 100a-100c may have processing and control functionality.

Any number of devices 100 may be included in the autonomous feeding system 200. Furthermore, such devices 100 may be located within a close proximity (e.g., within an acre) or may be connected over a distance (e.g., across hundreds of acres or more). Thus, the number and configuration of the devices 100a-100c is not intended to be limiting. The plurality of devices 100a-100c may also share a common RFID tag database 235 with feed histories 236a-236c. The devices 100a-100c may share the RFID tag database 235 by at least one of communication with the server 214, the user device 224, or between the devices 100a-100c. By sharing the RFID tag database, each of the plurality of devices 100a-100c may be configured to provide the animals a desired level of feed without overfeeding. In this regard, an animal (e.g., animal 226) may be fed at the first device 100a. The device 100a may update the feed history 236 associated with animal 226. If the animal 226 visits any of the devices 100a-100c before the animal is eligible for feeding, the devices 100a-100c will determine the ineligibility based on the updated feed history. The sharing of a common RFID tag database will thereby prevent the animal 226 from going between the devices 100a-100c and overfeeding.

In embodiments, the devices 100a-100c may include the same feed type. In embodiments, the devices 100a-100c may contain different types of feed. For example, the device 100a may include a feed with a supplemental buffer. Only cattle with acidosis may eat from the supplemental buffer. Non-acidosis cattle may eat from devices which are not treated with the supplemental buffer (e.g., devices 100b, 100c).

FIG. 4B illustrates a top view of the autonomous feeding system 200, in accordance with one or more embodiments of the present disclosure. The plurality of devices 100a-100c may also be configured to feed a plurality of animals (e.g., animals 226a-226c) simultaneously.

Figure 5:
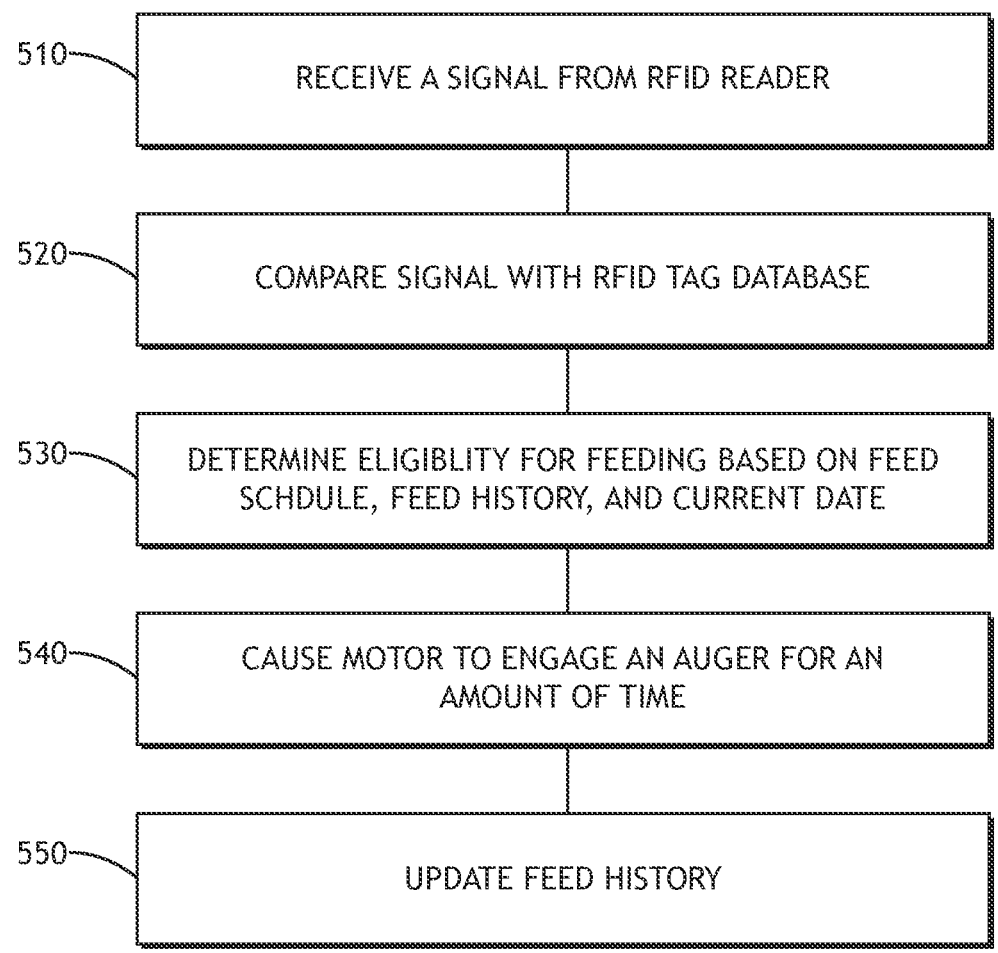
FIG. 5 illustrates a flow diagram of a method for autonomously livestock feeding animals, in accordance with one or more embodiments of the present disclosure.

FIG. 4C illustrates a simplified graphical user interface of the feed routine 228, in accordance with one or more embodiments of the present disclosure. The feed routine 228 may include bin feed weights 234a-234c associated with the devices 100a-100c. In embodiments, the feed routine 228 may also include a warning indicator 402. The warning indicator 402 may indicate a weight of feed in the bin is below a threshold amount (e.g., zero pounds). FIG. 5 illustrates a flow diagram of a method 500 for autonomously feeding livestock animals, in accordance with one or more embodiments of the present disclosure. The embodiments and the enabling technologies described previously herein in the context of the autonomous feeding device 100 and the autonomous feeding system 200 should be interpreted to extend to the method 500. It is further noted, however, that the method 500 is not limited to the architecture of the autonomous feeding device 100 or the autonomous feeding system 200.

In a step 510, a signal associated with an RFID tag is received. For example, a controller of an autonomous feeding device may receive the signal from an RFID reader (e.g., RFID reader 110).

In a step 520, the signal associated with the RFID tag is compared to RFID tags stored in an RFID tag database. As may be understood, any suitable comparison method may be used to perform the comparison, such as, but not limited to, a lookup table operation. Upon finding a matching RFID tag, a feed history associated with the RFID tag may also be looked up. If the comparison finds no matching RFID tag in the database, the unknown RFID tag may be stored and/or a notification may be sent to a user equipment.

In a step 530, a determination is made regarding whether the animal associated with the RFID tag is eligible for feeding. The eligibility determination may be based on one or more of the feed schedule of the feed routine, the feed history associated with the RFID tag, and the current date or time. For example, the feed schedule may include a daily feed schedule, such that the animal is only to be fed once per day. If the feed history of the animal together with the current day indicates the animal has not eaten within the last day, the animal may be eligible for feeding.

In a step 540, a motor is caused to rotate an auger. The motor may rotate the auger for an amount of time in response to determining the animal associated with the RFID tag is eligible for feeding. In this regard, if the animal is eligible for feeding, feed may be dispensed from the bin to the tray in response to such rotation of the auger. The amount of time in which the motor rotates the auger may be based on the output feed amount of the feed routine. In this regard, by turning the motor for the select amount of time, a select weight of feed may be dispensed to the tray. Similarly, if the RFID tag is unknown or if the animal is not eligible for feeding, the motor may not be engaged, such that no feed is dispensed.

In a step 550, the feed history associated with the animal is updated. The feed history may be updated in response to causing the motor to rotate the auger. Similarly, a number of fields of the feed history may be updated such as, but not limited to, the date, time, feed duration, feed dispensed, and feed eaten.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

Referring generally to FIGS. 1A-5, the device 100 for autonomously feeding animals is disclosed. Although the bin 102 is depicted with a wedge-shaped design, this is not intended as a limitation on the present disclosure. For example, the bin 102 may include a conical-shaped bin.

Although the device 100 is depicted as including one of the trays 108, this is not intended as a limitation on the present disclosure. It is contemplated that the device 100 may include that the device 100 may include one or more trays 108. The addition of trays 108 may be provided by extending a length of the device 100. In this regard, each tray 108 of the device 100 may provide a spot or station in which an animal may receive feed. As depicted, the tray 108 may be disposed behind the device 100, relative to the transport direction. Where the device 100 includes multiple of the trays 108, such trays may be oriented on a side of the device 100, relative to the transport direction (e.g., by rotating one or more components ninety degrees relative to transport).

In embodiments, the device 100 includes a power source. For example, the power source may include a connection to a utility grid (e.g., single phase 120 V AC, three phase 208 V AC, etc.). By way of another example, the power source may include a battery power source, a solar power source (e.g., a photovoltaic cell, a concentrated solar power source, an integrated solar combined cycle, a photovoltaic diesel system, a thermoelectric system, etc.) or a generator including a combustion engine (e.g., natural gas, diesel, gasoline, etc.) which rotates an alternator to generate an electric current and/or one or more batteries. Such power source may provide power to various components of the device 100, including, but not limited to, the auger 104, one or more sensors, or the controller 202.

In embodiments, the RFID reader is configured to read an RFID signal in a low frequency band. RFID systems occupy several frequency bands, such as a low frequency band (e.g., between 125 and 134 kHz). This low frequency band is typically used for the identification of animals, due to a relatively low RFID tag cost. Such low frequency animal tags may be passive tags. The passive tags may not contain a power source. The passive tags may include an antenna which creates a magnetic field under the presence of a radio wave (e.g., from the RFID reader 110). The use of a RFID system in the low frequency band is not intended as a limitation on the present disclosure. For example, the device 100 according to the present disclosure may be equipped to read a variety of RFID frequencies, such as, but not limited to, a high frequency (e.g., 13.56 MHz) or an ultra-high frequency (e.g., 433 MHz). Similarly, the use of a passive RFID tag is not intended to be limiting. For example, the RFID tag 210 may include an active tag or a battery-assisted passive tag. In this regard, the RFID system may be at least one of a passive reader active tag (PRAT) system, an active reader passive tag (ARPT) system, or an active reader active tag (ARAT) system at a suitable radio frequencies band.

In embodiments, the memory 206 may include data associated with animal data other than the animal's feed history. Such data may include, but is not limited to, age, animal weight, gender, breed, or health status (e.g., the presence of acidosis). In this regard, the controller 202 may include one or more program instructions to take the animal's feed history and the other animal data to calculate an amount of feed to dispense.

In embodiments, the device 100 is configured to be transported by the trailer 114, and includes one or more stall panels 112 which is pivotable for transport and feeding. However, this is not intended as a limitation on the present disclosure. For example, the device 100 may be configured to be a stationary feeder. Such stationary feeder may be moved by a forklift and include one or more fixed stall panels 112.

In embodiments, one or more components of the device 100, such as, but not limited to, the stall panels 112 may include tubing (mechanical or structural) or angle iron. Such tubing may include, but is not limited to, square tubing, rectangular tubing, circular tubing, or custom tubing. Such angle iron, but is not limited to, 90-degree angle, I-bar, T-bar, or U-channels. Furthermore, such components may include one or more materials known in the art, such as, but not limited to aluminum or steel. It is envisioned that where one or more of the components is a steel material, said component may be cold-forged, hot-forged, heat treating (e.g. annealing, quenching, tempering, etc.), surface treated, or treated with any other process to selectively adjust the material properties of the component, thereby improving strength and corrosion resistance.

The bin 102 may include any material known in the art. For example, the bin 102 may include material, such as, but not limited to, plastic (e.g., acrylonitrile-butadiene-styrene (ABS), acrylics, polyethylene (PE), polypropylene (PP), polyvinyl chloride (PVC), etc.); metal (e.g., aluminum, steel, or stainless steel, or composite materials. Furthermore, the bin 102 may be designed with several considerations, including, but not limited to, capacity and feed flow rate.

In embodiments, the device 100 is configured for feeding cattle. For example, a height of the tray 108 and a width between the stall panels 112 may be selected based on a typical size of such cattle. However, the present disclosure should not be limited to only cattle feeding applications. For example, a variety of livestock animals, such as, but not limited to, sheep, goats, and pigs may be tagged with an RFID tag (e.g., RFID tag 210). As such, a device 100 according to the present disclosure may be configured to provide feed to such animal. In this regard, one or more components of the device 100, such as a height of the tray 108 or a distance between the side panels, may be adjusted based on the type of animal to be fed.

In embodiments, the device 100 may include a plurality of augers 104 connected to a plurality of motors 106. The plurality of augers 104 may be located side-by-side along a bottom of the bin 102. In this regard, the augers 104 may be a smaller diameter as compared to the use of a single auger.

In embodiments, the device 100 may include a fly sprayer (not depicted). The fly sprayer may be located above the stall panels 112. The fly sprayer may be configured to spray an anti-fly spray on the animal 226. When the RFID tag of the animal 226 is read by the RFID reader 110, the fly sprayer may be engaged. The controller 202 may also be configured to determine whether the animal 226 is eligible to be sprayed by the fly sprayer. In this regard, the RFID tag database 235 may also include a list of dates on which the animal 226 was sprayed with the anti-fly spray by the device 100. Similarly, the controller 202 may be configured to spray the anti-fly spray according to a routine (e.g., once per week), which may be set by the user device 224. The anti-fly spray may be housed within one or more tanks (not depicted). The one or more tanks may be disposed near the motor 106 with a hose (not depicted) running from the tank to the fly sprayer.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. An autonomous feeding device comprising:
   a bin defining an interior chamber for holding a feed;
   a tray configured to receive the feed from the bin;
   an auger disposed within a bottom portion of the interior chamber;
   a motor coupled to the auger, wherein the motor is configured to rotate the auger for dispensing the feed from the bin to the tray;
   an identification unit disposed at or above a height of the tray;
   two stall panels, wherein each of the two stall panels are disposed adjacent to the tray for restricting access to the tray;
   a trailer and a plurality of leg members, the trailer including a frame member, a hitch, and at least two wheels, wherein the bin is coupled to the trailer by the plurality of leg members, wherein the two stall panels are coupled to at least one of the bin, the trailer, or the plurality of leg members by a pivotable connection; wherein an angle of the two stall panels relative to the tray is adjustable by the pivotable connection; and
   one or more processors and memory, the one or more processors configured to execute a set of program instructions stored in the memory, the set of program instructions configured to cause the one or more processors to:
      receive a signal indicative of an identification tag from the identification unit;
      determine an animal associated with the identification tag is eligible for feeding based on a feed history associated with the identification tag and a feed schedule of a feed routine;

cause the motor to rotate the auger for an amount of time in response to determining the animal associated with the identification tag is eligible for feeding, wherein the amount of time is based on an output feed amount of the feed routine; and
update the feed history.

2. The autonomous feeding device of claim 1, wherein the two stall panels are detachable from the pivotable connection for reducing a transport length of the autonomous feeding device.

3. The autonomous feeding device of claim 1, wherein the bin is a first bin, wherein the auger is a first auger, wherein the motor is a first motor, further comprising at least a second bin, a second auger, and a second motor, wherein the set of program instructions configured to cause the one or more processors to selectively cause the first motor to rotate the first auger for dispensing feed from the first bin to the tray and the second motor to rotate the second auger for dispensing feed from the second bin to the tray.

4. The autonomous feeding device of claim 3, wherein the set of program instructions are configured to cause the one or more processors to selectively cause the first motor to rotate the first auger and the second motor to rotate the second auger based on at least one of the feeding history, an animal age, an animal sex, an animal breed, or a weather condition.

5. The autonomous feeding device of claim 1, further comprising a spout and a spout lid; wherein the spout is disposed on a bottom edge of the bin;
wherein the feed is provided from the bin to the tray by way of the spout; wherein the spout lid is configured to cover the spout for preventing the feed from being dispensed from the spout when transporting the autonomous feeding device.

6. The autonomous feeding device of claim 1, the bin further comprising an access panel disposed below the auger providing access to the bottom portion of the interior chamber.

7. The autonomous feeding device of claim 1, wherein the set of program instructions are configured to cause the one or more processors to receive at least the feed history from a server; wherein the set of program instructions configured to cause the one or more processors to transmit an updated feeding history to the server.

8. The autonomous feeding device of claim 7, wherein the set of program instructions configured to cause the one or more processors to receive the feed routine from the server.

9. The autonomous feeding device of claim 1, wherein the feed routine includes a feed composition associated with the feed in the bin; wherein the set of program instructions are further configured to cause the one or more processors to cause the motor to rotate the auger with a select revolutions per minute based on the feed composition.

10. The autonomous feeding device of claim 1, wherein the set of program instructions are further configured to cause the one or more processors to increase the output feed amount in response to determining a prior missed feeding in the feed history.

11. The autonomous feeding device of claim 1, wherein the set of program instructions are further configured to cause the one or more processors to:
receive a second signal indicative of a second identification tag from the identification unit; and
determine the second identification tag is not eligible for feeding based on a second feed history associated with the second identification tag.

12. The autonomous feeding device of claim 1, further comprising a sensor configured to generate a signal associated with one of a weight of the feed in the tray, a weight of the feed in the bin, or a weight of a feed of a scale disposed between the bin and the tray.

13. The autonomous feeding device of claim 12, wherein updating the feed history includes an amount of the feed eaten determined based on the signal associated with one of the weight of the feed in the tray, the weight of the feed in the bin, or the weight of the feed of the scale disposed between the bin and the tray.

14. The autonomous feeding device of claim 12, wherein the processor is further configured to control the motor by a feed-back control based on the signal associated with one of the weight of feed in the tray, the weight of feed in the bin, or the weight of the feed of the scale disposed between the bin and the tray.

15. The autonomous feeding device of claim 1, further comprising an auger shield disposed within the interior chamber of the bin, wherein the auger shield is disposed above the auger; wherein the auger shield is configured to transfer at least a portion of a weight of the feed in the bin to the bin.

16. A autonomous feeding system comprising:
a server including a feed history and a feed routine, wherein the feed history is associated with an identification tag of an animal, the feed routine including a feed schedule and an output feed amount;
a plurality of autonomous feeding devices communicatively coupled to the server, each of the plurality of autonomous feeding devices including:
a bin defining an interior chamber for holding a feed;
a tray configured to receive the feed from the bin;
an auger disposed within a bottom portion of the interior chamber;
a motor coupled to the auger, wherein the motor is configured to rotate the auger for dispensing the feed from the bin to the tray;
an identification unit disposed at or above a height of the tray;
two stall panels, wherein each of the two stall panels are disposed adjacent to the tray for restricting access to the tray;
a trailer and a plurality of leg members, the trailer including a frame member, a hitch, and at least two wheels, wherein the bin is coupled to the trailer by the plurality of leg members, wherein the two stall panels are coupled to at least one of the bin, the trailer, or the plurality of leg members by a pivotable connection; wherein an angle of the two stall panels relative to the tray is adjustable by the pivotable connection; and
one or more processors and memory, the one or more processors configured to execute a set of program instructions stored in the memory, the set of program instructions configured to cause the one or more processors to:
receive the feed history and the feed routine from the server;
receive a signal indicative of the identification tag from the identification unit;
determine an animal associated with the identification tag is eligible for feeding based on the feed history associated with the identification tag and the feed schedule;
cause the motor to rotate the auger for an amount of time in response to determining the animal associated with the identification tag is eligible for feeding, wherein the amount of time is based on the output feed amount; and cause the server to update the feed history.

17. The autonomous feeding system of claim 16, further comprising a user equipment communicatively coupled to at least the server;

wherein the user equipment is configured to cause the server to update the feed schedule and the output feed amount.

* * * * *